United States Patent
Lee

(10) Patent No.: US 12,499,278 B1
(45) Date of Patent: *Dec. 16, 2025

(54) DI INTERCOMMUNICATION FOR CYBERSECURITY PROTECTION AND OS PIRACY PROTECTION

(71) Applicant: DI Cybersecurity Corporation, Bloomfield Mills, MI (US)

(72) Inventor: Howard Hong-Dough Lee, Bloomfield Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/790,993

(22) Filed: Jul. 31, 2024

(51) Int. Cl.
*G06F 21/73* (2013.01)

(52) U.S. Cl.
CPC ................... *G06F 21/73* (2013.01)

(58) Field of Classification Search
CPC ...................................... G06F 21/73
USPC .......................................... 726/34
See application file for complete search history.

(56) References Cited

U.S. PATENT DOCUMENTS

| | | | |
|---|---|---|---|
| 7,058,613 B1 | 6/2006 | Sato et al. | |
| 7,113,577 B2 * | 9/2006 | Cook | H04M 7/128 379/247 |
| 8,204,833 B2 | 6/2012 | Mu et al. | |
| 8,413,898 B2 * | 4/2013 | Heffez | G06Q 20/401 235/382 |
| 8,590,007 B2 | 11/2013 | Heffez | |
| 9,060,057 B1 | 6/2015 | Danis | |
| 10,674,009 B1 * | 6/2020 | Jakobsson | H04M 3/42042 |
| 10,757,116 B2 | 8/2020 | Ardeli et al. | |
| 10,938,811 B2 | 3/2021 | Dwarkaprasad et al. | |
| 11,146,676 B2 | 10/2021 | Sena, Jr. et al. | |
| 11,218,324 B2 | 1/2022 | Wentz et al. | |
| 11,337,076 B2 | 5/2022 | Kudtarkar et al. | |
| 2013/0125220 A1 * | 5/2013 | Heffez | G06F 21/31 726/5 |
| 2020/0004936 A1 | 1/2020 | Avital | |
| 2020/0125729 A1 | 4/2020 | Priel | |
| 2020/0285718 A1 * | 9/2020 | Posillico | G06F 21/73 |
| 2022/0060498 A1 | 2/2022 | Head, Jr. et al. | |
| 2022/0394446 A1 * | 12/2022 | Mcclellan | H04W 12/50 |
| 2023/0155829 A1 | 5/2023 | Pabijanskas et al. | |
| 2023/0156023 A1 | 5/2023 | Albero et al. | |

(Continued)

*Primary Examiner* — Dereena T Cattungal

(57) ABSTRACT

A method actuating a device to perform hardware interfacing for hardware and/or OS IDs (referring to identification numbers and/or serial numbers) embedded or installed thereon, setting at least one of the IDs as DI (device identification) information, and selectively allowing the DI information to be transmitted out, for providing cybersecurity protection to the device itself and/or to an external control system/Internet system to be accessed, for establishing unique DI intercommunication with the external control system/Internet system, for replacing the conventional antivirus software, for providing OS piracy protection to an OS maker, for functioning as a unique private key in encrypting/decrypting outgoing commands and/or feedback signals, wherein the device may be any communication device, computer, control system, server, Internet system, smartphone, smartwatch, Autonomous Thing (AuT), Internet of Autonomous Thing (IoAT), Internet of Medical Thing (IoMT), AI device/machine, robot, android, autonomous car or unmanned aerial vehicle, drone or unmanned aircraft system.

20 Claims, 13 Drawing Sheets

(56) References Cited

U.S. PATENT DOCUMENTS

| | | | |
|---|---|---|---|
| 2023/0275932 A1* | 8/2023 | Brotherson | H04L 63/205 726/3 |
| 2023/0281687 A1* | 9/2023 | Bhardwaj | G06Q 30/0609 705/26.35 |

* cited by examiner

1200

1300 though the ac# DI INTERCOMMUNICATION FOR CYBERSECURITY PROTECTION AND OS PIRACY PROTECTION

FIELD OF THE INVENTION

The present invention relates generally to the field of providing cybersecurity protection and software piracy protection. More particularly is to enable any device containing communication circuitry to provide DI (device identification) information by hardware interfacing and to selectively allow the transmitting of the DI information to an external system for establishing DI intercommunication. Also related is to advance cybersecurity protection by the use of the DI information as a unique private key for encrypting and decrypting signals to be transmitted in the DI intercommunication.

BACKGROUND OF THE INVENTION

Devoted in the research of energy-conserving power systems starting in 1998, Applicant had made some contributions on Energy-conserving power-supply system, U.S. Pat. No. 6,098,175 (2000); Energy-conserving power systems utilizing a keep-alive DC power to consistently power a control circuit, U.S. Pat. No. 6,098,175; computers accessible remotely and instantaneously with keep-alive memory, U.S. Pat. No. 6,341,354; Communication apparatus selectively switching between a main processor with main operating instructions and keep alive processor with keep alive operating instructions, U.S. Pat. No. 6,658,576; Apparatus and operating system having multiple operating functions stored in keep-alive memory, U.S. Pat. No. 6,920,573; and Operating system for providing energy-conserving operating functions, U.S. 2005/0268126-A1. Energy conserving is a crucial feature necessary for the development of many modern computers/laptops, servers, cellphones (or cellular phones and smartphones), AI (artificial intelligence) and other digital communication applications, which on the other hand also provides convenience to cybercriminals, including phone scammers employing computers or smartphones with the energy-conserving power features mentioned hereinabove.

One of the most facilitating factor attributed to the sky-rocketing cyber risks and the devastating business impacts with financial losses in billions of dollars lies in the fact that it is essentially a cost-free scheme to the cybercriminals after their initial spending for acquiring stolen sensitive data, ransomware, malware, exploit kits, and cyberattack services from the Dark web. The Dark web is known as a part of the Deep web intentionally hidden, unindexed and inaccessible by search engines for use in concealing and promoting heinous cybercrime activities. The severity of the situation continues to be evident with the newly developed application of OpenAI's ChatGPT due to a bug in an open-source library it used that exposed the payment-related and other sensitive information of its ChatGPT Plus subscribers. Use of ChatGPT can also invite accidental leak out of company information. Cybercriminals can deploy AI to make voice and video replicas of a friend or relative of a victim for conducting a video phone scam.

In view of scam phone calls, U.S. Pat. No. 9,060,057 disclosed a system or method for caller ID authentication and spoof detection by based call handling such as whitelisted and blacklisted phone numbers. However, '057 was teaching to block all without giving an option of leaving a voicemail for a mistakenly identified phone call. U.S. Pat. No. 11,146,676 provided a method for automatically authenticating an incoming call through a shared secret and a login credential. U.S. Pat. No. 10,757,116 disclosed a system and method for dynamically modifying role based access control for a client based on the activity, which was initially granted access to a network resource and then determined by a second reputation score to be modified. U.S. Pat. No. 10,938,811 provided a communicator configured to communicate with a host apparatus and an external apparatus, and a processor configured to rely on a "user ID" of the external apparatus from the external apparatus for achieving secure access of information. U.S. Pat. No. 11,218,324 disclosed a method of authenticating a requesting device using verified evaluators by an authenticating device configured to receive and digitally signed assertions. U.S. Patent Application No. 2023/0156023 provided a computing platform for a secure participation by authenticating the biometric information of a user to be received. U.S. Patent Application No. 2022/0060498 aimed to protect a network of nodes from malicious or unauthorized activity by processing the data packet to determine whether the data packet, the first node or the second node is untrustworthy. U.S. Pat. No. 11,337,076 offered a security platform of a data network executed on a router of the home network. U.S. Pat. No. 7,058,613 disclosed a device comprising arithmetic-formulas for checking user identification. U.S. Patent Application No. 2023/0155829 provided another authentication scheme in a virtual private network by confirming authenticity/identity of a user.

Evidently, these prior art patents mentioned above achieved various aspects of cybersecurity but much relied on authenticating user ID or biometric information. U.S. Pat. No. 8,204,833 provided a technique to generate fingerprint of computer and its user based on the information collected through the actions a user conducts on the Internet. '833 treated a device and account information as one whole set of entry for authentication instead of relying on the individual's representation. These prior art patents and applications are generally related to Class 726 Information Security and CPC classification under Subclass H04L transmission of digital information.

For a more rigorous support of the novelty of the present invention, broadly considered are subgroups with various degrees of relevance considered herein including H04L 65/1079 Call control specifically associated with the identification of SPAM VoIP calls; 51/212 Message switching systems, e.g. electronic mail systems, with filtering and selective blocking capabilities; 63/14 for detecting or protecting against malicious traffic; 63/00 Network architectures or network communication protocols for network security; H04L 63/1458 Mitigation of denial of service attacks; 9/3226 using a predetermined password, passphrase or PIN for supporting authentication of entities; 9/32 including means for verifying the identity or authority of a user of the system; 63/00 Network architectures or network communication protocols for network security; 9/00 cryptographic mechanisms or cryptographic arrangements for secret or secure communication; H04W 12/00 network architectures or network communication protocols for wireless network security; and G06F 21/00 security arrangements for protecting computers or computer systems against unauthorized activity.

U.S. Pat. No. 8,413,898 teaches assigning a geographical location to an Internet user by using a web site to identify a computer signature of a wireless communication device for providing search results associated with the saved geographical location back to the wireless communication device. U.S. Patent Application No. 2013/0125220 teaches identifying, by means of the website, a computer signature of an Internet user. However, under the current practice of the Internet accessing, the computer signature available for deriving based on Heffez's teaching would be limited to the identifiers contained in the existed data packet.

In contrast to the prior art of utilizing user authentication, manual response of a code, or common signature for granting network access, the present invention aims to achieve cybersecurity protection by obtaining permission from an owner for building unique DI (device identification) information of the internal components of an autonomous device (including autonomous thing, vehicle, drone, machine/device, smartphone, communication or external control system) and for allowing the unique DI information to be transmitted out to the external control system, or by proactively creating a punitive measure to incur financial damages to cybercriminals and cyberterrorisms. More specifically disclosed is to create, update and sync a banned and/or an allowed DI (device identification) list. The punitive measure in conjunction with the banned DI list is to financially incur punitive damages to Internet cybercriminals by rendering their communication devices involved in malicious activities once identified incapable of gaining future access to secured or even non-secured Internet or network communications. In accordance with the present invention, for the first time, no cybercriminal can proceed with a malicious cybercrime activity without being exposed to a risk of the punitive damages. The allowed DI list comprises the device identification information of the communication devices that are predefined or preselected for granting access to DI-member-only Internet or network access, thus precluding any unauthorized activity from unknown communication devices.

SUMMARY OF THE INVENTION

Accordingly, a first primary preferred embodiment of the present invention is to provide a cybersecurity Internet system with a punitive measure for incurring punitive damages to cybercriminals and cyberterrorisms. In particular, the punitive measure is to ban the Internet access functionality of a cybercriminal's communication device once identified to get involved in cybercrime activities. Comprised in the cybersecurity Internet system of the first primary preferred embodiment are (a) communication means for accessing the Internet data; (b) memory means storing a banned DI (device identification) list of the communication devices to be banned from giving Internet or online access; (c) a control system for controlling operation of the communication means and the memory means; and (d) operating instructions stored in the memory means available to the control system for (i) allowing the communication means to start a first stage of communication in response to an incoming signal issued from a communication device, for obtaining the DI information of the communication device; (ii) elevating the communication device to a second stage of communication for granting online access to a webpage, only if the DI information is received and not comprised in the banned DI list; (iii) imposing the punitive measure by revoking the online access previously granted to the communication device, if detecting the online access involved in an unwanted activity on the webpage; and (iv) adding the DI information of the communication device involved in the unwanted activity to the banned DI list so as to achieve the punitive measure. In addition, the punitive measure will further deprive the reusability of its hardware devices/components and invalid its per-machine-based operating system license once registered in the banned DI list, so as to incur punitive damages to cybercriminals and cyberterrorisms. The operating instructions are further rendered to sync the banned DI list with other Internet systems participated in the cybersecurity protection, so that any communication device with its DI information once identified to get involved in the unwanted activity on one Internet system will be banned across-the-board by all of the other Internet systems as the punitive damages.

A second primary preferred embodiment of the present invention is to provide a punitive cybersecurity protection method on secured Internet data. The method comprises (a) setting DI information required to be obtained for any remote communication device requesting online access, wherein the DI information comprises at least one ID selected from the group consisting of the IDs of the hardware components and/or software of the remote communication device, and wherein the IDs refer to identification, identifier, identity, serial number and/or address; (b) building a banned DI list for the remote communication devices to be banned from giving online access to the secured data; (c) in response to an incoming signal of a communication device, obtaining the DI information of the communication device; and (d) granting access to the secured data, only if the DI information is obtained and not comprised in the banned DI list; (e) disallowing the online access, if detecting the communication device involved in an unwanted activity on the secured webpage; and (f) adding the DI information of the communication device involved in the unwanted activity to the banned DI list so as to update the punitive measure.

A third primary preferred embodiment of the present invention is to provide a punitive cybersecurity operating method further on public or non-secured Internet data. The method comprises (a) building a banned DI list for the communication devices to be banned from giving online access as the punitive measure; (b) in response to an incoming signal issued from a communication device, obtaining the DI information of the communication device; (c) granting online access on a webpage, only if the DI information is received and not comprised in the banned DI list; (d) banning the online access, if detecting the communication device involved in an unwanted activity on the webpage; and (e) adding the DI information of the communication device involved in the unwanted activity to the banned DI list so as to update the punitive measure.

A fourth primary preferred embodiment of the present invention is to provide a DI-Member-Only cybersecurity operating method. The method comprises (a) building an allowed DI list for the communication devices predefined or preselected to be allowed for accessing a DI-Member-Only network; (b) in response to an incoming signal issued from a communication device, obtaining the DI information of the communication device; (c) granting access to the DI-Member-Only network, only if the DI information is received and comprised in the allowed DI list; and (d) updating the allowed DI list, if needed.

A fifth primary preferred embodiment of the present invention is to provide a cybersecurity protection method for a smartphone aiming to deal with scam phone calls and/or phishing messages. The method comprises (a) building an allowed list to be allowed, a disallowed list to be disallowed, a repeated list to be proceeded contingently in conjunction with the disallowed list, and/or a banned list to be banned always, wherein the allowed list comprises at least the contacts of the smartphone as a contacts list, and wherein the repeated list refers to the incoming signals repeatedly requesting for establishing communication; (b) providing a first stage of communication in mute mode or a "time-independent Do Not Disturb" mode during the normal operation (i.e., the conventional time-dependent "Do Not Disturb" mode is turned off" during the daytime) for the steps of (i) obtaining ID information from incoming signals, wherein the ID refers to identification selected from the group consisting of at least one phone number, at least one sender identity, at least one email address, at least one social network media account, at least one device identification (such as name, serial number, or a string of characters), at least one social network media account, and any of their combinations; (ii) comparing the ID information with the allowed list, the disallowed list, the banned list, and the repeated list; (iii) declining communication request, if the ID information has a match with the banned list, and/or with the disallowed list, but not with the repeated list; and (iv) allowing to leave a message, if the ID information is not comprised in any of the allowed list, the disallowed list and the repeated list; wherein the message is selected from the group consisting of a voicemail, a text message, a multimedia message, a video message, and any of their combinations; and (c) elevating the smartphone to a second stage of communication in active mode signifying an audio/visual/vibration notification to which prompt attention should be given, when the ID information has a match (i) with the allowed list, and/or (ii) with the repeated list but not with the disallowed list.

A sixth primary preferred embodiment of the present invention is to provide a DI operating system for establishing DI communication, comprising: (a) building a DI database on an Internet communication device for controlling if an online access request from a communication device should be granted or not, wherein the DI database comprises the DI information of the communication devices to be controlled, and the DI information is selected from the group consisting of system DI, hardware DI, software DI, any of their conversions, and any of combinations of their individual component IDs; (b) setting specified DI information to be received from the communication device issuing the online access request; (c) formatting the specified DI information into at least one DI packet, referring to a string of bits; and (d) transmitting the at least one DI packet from the communication device to the Internet communication device for verification.

A seventh primary preferred embodiment is to provide a trusted DI module (or chip) for enabling trusted inbound and outbound communications, comprising: (a) input/output means for establishing circuit connection with hardware components such as motherboard, microprocessor, graphics processing unit, and memory storage; (b) DI interfacing means in circuit connection with the input/output means, for obtaining ID information of said hardware components and said software selected from the group consisting of computer system product ID, universally unique identifier, Internet IP address, domain name address, URL address, MAC addresses of wired and/or wireless communication circuitry, Mobile Equipment ID, phone number ID, hardware VPN ID, Basic Input/Output System firmware ID, motherboard ID, microprocessor ID, graphics processing unit ID, RAM module ID, memory storage ID, TPM module ID including generated ID, DI chip, monitor ID, device OS license ID, activation ID, installation ID, digital license ID, machine ID (including Client Machine ID), software VPN ID, user account ID linked to software developer server for account verification, virtual phone number ID, social network media account ID, digital key ID, biometric data ID, and any of their combinations; and wherein the ID refers to identification, identifier, identity, serial number and/or address selected from the group consisting of numbers, letters, character, typographical symbol, and any of their combinations; and (c) control means comprising a coprocessor and instructions for (i) setting the content of the IDs to be focused and selected and/or comprised for forming the DI information; and (ii) formatting the DI information in a form suitable for transmitting so as to provide the trusted DI communications to a remote communication device; (d) persistent memory circuitry for storing the DI information as the device fingerprint for enabling the trusted inbound and outbound communications; (e) a cryptoprocessor for encoding, enciphering, and/or hashing the DI information; and/or (f) communication circuitry for receiving and for controlling incoming signals from a remote communication device, so as to preclude any inbound cyberattack from getting into device memory storage.

An eighth primary preferred embodiment is to provide a DI chip for enabling trusted inbound and outbound communications, comprising: (a) input/output means for establishing circuit connection with hardware components such as motherboard, microprocessor, graphics processing unit, and memory storage; (b) buses in circuit connection with the input/output means, for proceeding with internal interfacing with the hardware and its OS/software; and (c) control means comprising a coprocessor and instructions for (i) setting the content of the IDs to be focused and selected and/or comprised for forming the DI information; and (ii) formatting the DI information in a form suitable for transmitting so as to provide the trusted DI communications to a remote communication device; (d) persistent memory circuitry for storing the DI information as the device fingerprint for enabling the trusted inbound and outbound communications, without performing the internal interfacing; (e) a cryptoprocessor for encoding, enciphering, and/or hashing the DI information; and/or (f) communication circuitry for receiving and for controlling incoming signals from a remote communication device, so as to preclude any inbound cyberattack from getting into device memory storage.

A ninth primary preferred embodiment is a DI operating method for rendering an autonomous device or thing capable of providing cybersecurity protection to an external control system. The DI operating method comprises: (a) monitoring if the autonomous device receives owner permission for transmitting its DI (device identification) information to the external control system; (b) if yes, checking if the DI information exists; (c) actuating the autonomous device to perform hardware interfacing for device IDs embedded thereon, wherein the autonomous device comprises communication circuitry for establishing intercommunication with the external control system; (d) setting at least one of the device IDs to be focused as DI information referring to a unique device fingerprint of the autonomous device; (e) storing the DI information if necessary; (f) determining if the autonomous device is allowed to transmit the DI information to the external control system.

A tenth primary preferred embodiment is an operating method rendering an autonomous device cybersecurity protected, comprising: (a) enabling the autonomous device, in response to a feedback signals issued from an external device or control system, to request the external device or control system to provide external device IDs if detecting the feedback signals contain no device ID in digital form, wherein the external device comprises at least communication circuitry for establishing intercommunication with the autonomous device; (b) retrieving the external device IDs from the enabling, for use as a unique fingerprint of the external device; (c) building allowed device IDs resided on the autonomous device, representing the remote devices or control systems to be allowed for intercommunication; and (d) allowing the external device to establish intercommunication with the autonomous device through the communication circuitry, only if the unique fingerprint is obtained and comprised in the allowed device IDs resided on the autonomous device.

An eleventh primary preferred embodiment is an operating method for providing software piracy protection and cybersecurity protection, comprising: (a) enabling a verification server, in response to an incoming signal issued from an external device containing no device ID, to request the external device to provide device hardware IDs embedded and device OS IDs installed on the external device, wherein the IDs refer to identification numbers and/or serial numbers; (b) retrieving the device hardware IDs and the device OS IDs from the external device to the verification server; (c) setting at least one of the device hardware IDs to be focused as hardware DI information of the external device; (d) building an OS-DI database stored on server memory circuitry in circuit connection with the verification server, for associating OS IDs with registered hardware DI information of registered external devices; (e) validating the device OS ID and the hardware DI information retrieved from the external device in comparison with the OS-DI database; and (f) if validated, activating the device OS ID.

A twelfth primary preferred embodiment is an operating method for establishing DI intercommunication with cybersecurity protection between a control device and a robotic device. The operating method comprises (a) requesting the control device be internally interfaced for its hardware IDs (referring to identification numbers, and/or serial numbers) embedded thereon, as master DI information; (b) separately requesting the robotic device be internally interfaced for its hardware IDs embedded thereon, as robot DI information; (c) registering the master DI information onto the robotic device, and/or the robot DI information onto the control device, for establishing ownership; (d) attaching a command to be issued from the control device with the master DI information and/or the robot DI information for establishing the DI intercommunication; (e) instructing the robot to verify if the command received externally is attached with the master DI information and/or the robot DI information; and (f) allowing the robot to execute the command received if the master DI information and/or the robot DI information is validated, so as to provide the cybersecurity protection to the DI intercommunication.

A thirteenth primary preferred embodiment is a method for providing DI-encrypted intercommunication with cybersecurity protection exemplarily to a control device and a robot, by (a) encrypting a command to be issued from the control device selectively with the master DI information obtained from the control device and/or the robot DI information from the robot for establishing the DI-encrypted intercommunication; (b) instructing the robot to decrypt the encrypted command externally received selectively with the master DI information and/or the robot DI information; and (c) allowing the robot to execute the command if the encrypted command is successfully decrypted, so as to provide the cybersecurity protection to the DI-encrypted intercommunication.

DETAILED DESCRIPTION OF THE PREFERRED EMBODIMENT

Some Definitions on Devices

Figure 1:
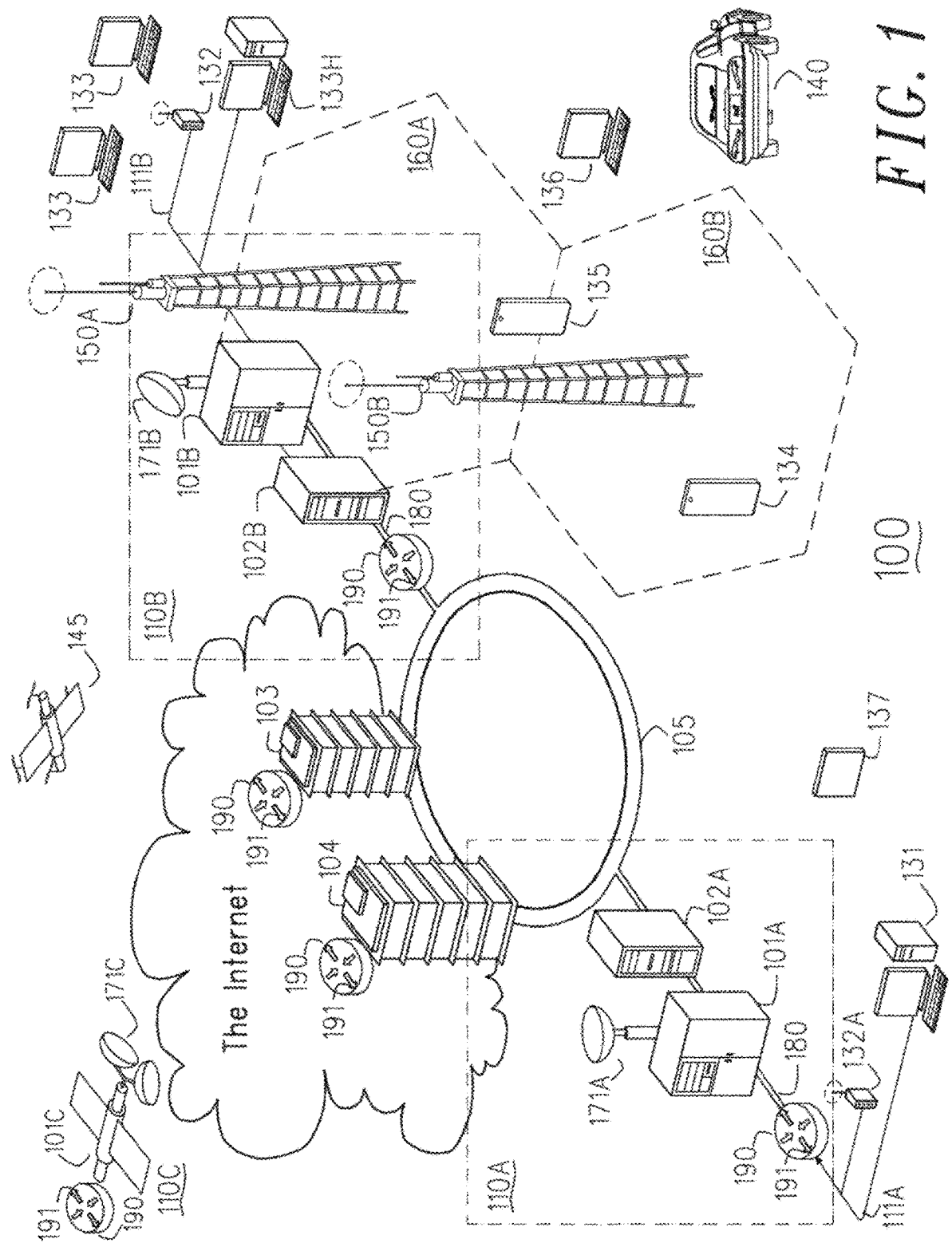
FIG. 1 depicts punitive cybersecurity communication devices and systems in various layouts in accordance with a first primary preferred embodiment of the present invention.

To facilitate the illustration of the present invention, the elements depicted in FIGS. 1 and 8 and recited in the context are grouped under the term "devices" as follows:
(A) "Non-communication devices"
 each generally for use as a component or part, incapable of achieving Internet or network communication by itself, exemplarily including (i) Hardware Devices or components such as MPU/CPU, GPU, RAM, memory circuitry or storage, firmware, ROM, TPM (Trusted Platform Module), embedded chip, communication connecting means 180 (including wired network cables or wireless transmissions), and (ii) Software such as operation instructions, app, platform, or operating system; and (B) "Communication devices" each being properly integrated with the non-communication devices, capable of providing Internet/network connection or communication, exemplarily including:

(i) Communication Means 191 having communication circuitry in wired or wireless transmission utilized by router, Ethernet, Wi-Fi, NearLink, Bluetooth, NFC, UWB (Ultra Wide Band), and Mobile Equipment module such as IMEI/IMEISV/ICCID/IMSI Mobile Broadband Service card;

(ii) Internet Communication Devices or Internet Systems shown in FIG. 1 such as punitive Internet communication systems 110, 110A, 110B and 110C or cybersecurity protection means 190, ISPs (Internet Service Providers), private server 131, website host providers, cloud computers, NSP (network service provider)/MAE (Metropolitan Area Exchange)/NAP (Network Access Point) 103 and deep sea data center/cloud storage 104, which are mainly for providing the Internet or for hosting Internet data to be accessed; and (iii) Personal Communication Devices such as Wi-Fi device or router 132 and NearLink 132A, computer 131, 133, 133H, 136, tablet 137, smartphone or cellphone 134 and 135, which are ready for personal usage in accessing the Internet data resided on the Internet systems.

The Internet communication devices and the personal communication devices are generally used respectively by Internet data providers (for providing Internet or hosting online data) and Internet data users (for accessing the Internet or online data). Internet access and online access are treated generally exchangeable in the present invention, since a plurality of personal communication devices may be locally connected to a corporate server (with corporate data stored thereon for online access) or to an Internet communication device further connected to an Internet provider (without having Internet data stored therein) for accessing the Internet externally. In other words, both arrangements provide the personal communication devices with a controlled local network or with a shared Internet access from the Internet communication device. Accordingly, the punitive cybersecurity protection will be applicable to both Internet and online accessing.

Punitive Cybersecurity Protection for Internet and Personal Communication Devices A first primary preferred embodiment is embodied in a cybersecurity communication device, apparatus, equipment, or system rendered capable of imposing a punitive measure to cybercriminal. The punitive measure is aiming to render the communication devices once identified to get involved in a cyberattack incapable of accessing the Internet or online network. The punitive cybersecurity protection may be implemented both to personal communication devices (such as computers, mini PCs, laptops, notebooks, tablets, and smartphones capable of accessing online or Internet data for personal usage) and to Internet systems (such as Internet service providers, web hosts, severs, search engines, data centers, social network media systems, cloud storage, and others for Internet servicing usage) in a global scale.

Depicted in FIG. 1 is a "punitive cybersecurity system" (PCS hereinafter) of the present invention, aiming to provide a new Internet system or network server or to implement the NSP and/or ISPs with cybersecurity protection means 190 or Internet communication systems 110A, 110B and 110C (punitive satellite communication system including earth stations 171A, 171B, and satellite/GPS 171C) and wireless systems (with cell towers or base transceiver stations 150A and 150B) of the present invention. Each of Internet communication systems 110A, 110B and 110C basically comprises one of Internet communication units 101A, 101B and 101C multitaskingly connected to ISP backbone 105 at separate locations and to memory-storage means 102A and 102B that may also function as servers, mainframes or cloud computers/storage for hosting websites each containing a plurality of webpages and for storing data or for providing cloud computing. ISP backbone 105 has connectivity multitaskingly with Internet backbone carrier sites often at NSP/MAE/NAP 103 and deep sea data center/cloud storage 104. Mostly important is that punitive Internet communication systems 110A, 110B, 110C, 103 (NSP/MAE/NAP), and 104 (deep sea data center/cloud storage), each comprises cybersecurity protection means 190.

In brief, depicted in FIG. 1 are seven layouts for providing the punitive cybersecurity protection from a global scale descending to a personal scale, comprising (i) PCS 100 as a global integrated system, (ii) each of NSP/MAE/NAP 103 and deep sea data centers/cloud storage 104, (iii) each of punitive Internet communication systems 110A, 110B and punitive satellite communication system 110C, (iv) each of Internet communication unit 101A, 101B or 101C, (v) each of cybersecurity protection means 190, (vi) small private server 131 connected with LAN 111A, and (vii) each of smartphones 134 and 135, computers 136 (connected with cellular data), autonomous cars or unmanned aerial vehicles (UAVs) 140, and drones or unmanned aircraft system (UAS) 145, which is generally recited as a personal communication device.

Layouts (i) to (vi) are exemplary applications offering the punitive cybersecurity protection to protect "Internet data" resided on memory-storage means 102A and 102B functioning as servers, mainframes or cloud computers/storage, NSP/MAE/NAP 103 and deep sea data centers/cloud storage 104, and private server 131, which will be accessed by various personal communication devices. On the other hand, layout (vii) is to provide the punitive cybersecurity protection to protect "personal data" resided on personal communication devices such as computer 131, 133, 133H, 136, tablet 137, smartphone or cellphone 134 and 135, computers 136, autonomous cars or UAVs 140, and drones or UAS 145 for personal usage.

Without the present invention, cybercriminals may operate as a group collaboratively through a Wi-Fi device or router 132 by deploying several units of computer 133 or may independently utilize a single computer 133H (for instance) alone through a home LAN 111B, which connects to a tier 3 ISP having access to the network infrastructure of NSP/MAE/NAP 103 or deep sea data center/cloud storage 104 via a PoP, which establishes peer to peer connections globally via IXPs (Internet exchange points) having common grounds of IP networking, allowing participated ISPs to exchange data therewithin. Similarly, portable communication devices such as smartphone/cellphone or car phone 134 moved from cell region 160A to cell region 160B may be used as a hacking or scamming tool along with a Bluetooth keyboard and mouse (not shown). Without the punitive cybersecurity systems such as 110A, 110B and 110C or cybersecurity protection means 190, the conventional ISPs, private server 131, website host providers, NSP/MAE/NAP 103 and deep sea data center/cloud storage 104 may also be potentially subjected to continuous cyberattacks from cybercriminals free of any charge.

Cybersecurity protection means 190 is rendered to collect the device identification (or identity/identifier) hereinafter defined as "DI" information communication devices, to store a banned DI list for the communication devices to be banned from giving online access, and further to execute the process of banning in accordance with the banned DI list. Cybersecurity protection means 190 each in a separated unit, functioning as if an isolated security guard or a security gate in front of a corporate building entrance. The isolation or separation of cybersecurity protection means 190 from Internet communication unit 101A, 101B or 101C and NSP/MAE/NAP 103 or deep sea data center/cloud storage 104 offers a special hardware level of cybersecurity protection to the Internet data. Without the isolation, malicious ransomware, malware, Trojan horse or viruses are able to travel and spread throughout entire memory storage drives, NVMe modules, solid state drives and/or hard drive disks connected with internal buses.

Instead, the traveling and spreading will be fully stopped by the isolation strategy, in conjunction with the use of external communication connecting means 180 including wired network cables or wireless transmissions between cybersecurity protection means 190 and Internet communication unit 101A, 101B or 101C. Aside from providing the cybersecurity protection, the present isolation will further facilitate the process of backup and thus restoration if ever needed due to the ignorable data size of the banned DI list as compared to the massive amount of Internet data on servers, mainframes or cloud storage.

In the present invention, the DI information of a communication device refers to a set of device identification information that may generally include Internet IP (Internet protocol) address, MAC (media access control) address that is a unique identifier assigned to a network interface controller (NIC) for use as a network address in communications such as a cellphone, Ethernet, Wi-Fi, NearLink, Bluetooth, NFC, and UWB assigned by device manufacturers, which are the burned-in, hardware address through read-only memory or a firmware mechanism. Also, the DI information will include domain name address and/or URL (Uniform Resource Locators) address information in order to protect personal communication device and data to be further illustrated under the section entitled "Punitive Cybersecurity Protection on Personal Communication Devices" and will be extended to include other hardware and software to be further discussed under the section entitled "Cybersecurity Operating System for Enabling DI Communication" hereinafter in conjunction with FIG. 6.

In addition, the term "DI information" recited in the present invention may further refer to any conversion or transformation of the device IDs or serial numbers. The conversion or transformation may be derived from encoding, enciphering, hashing, and any of their combinations. The punitive measure of the present invention may be enforced, so long as the representations of the DI information to be banned or allowed are respectively stored in a banned or an allowed list for comparison.

A packet in IPV4 or IPv6 is a string of bits which may be a small segment of a larger message, comprising network interface identification, location addressing, and actual data. Each packet has a header string and a data string. The sizes of the header string (without data) may be 20 bytes long minimally for IPV4 (using 32 bits), or 40 bytes for IPV6 (using 128 bits). The present invention may employ other lengths of bytes for including the DI information recited hereinabove and to be further elaborated under the section entitled "Cybersecurity Operating System for Enabling DI Communication." The information contained in the header string includes the Internet IP addresses of a source device (such as Wi-Fi device or router 132 and NearLink 132A, computer 131, 133, 133H, 136, tablet 137, smartphone or cellphone 134 and 135, autonomous cars or UAVs 140, and drones or UAS 145) and the destination (such as a website hosted on server 131 or the websites resided on NSP/MAE/NAP 103 and deep sea data center/cloud storage 104), plus other fields for helping in routing the packet properly. The data is the actual content requested for access by the personal communication device, which contains a string of letters or part of a destination webpage.

The present invention introduces for the first time and defines the term "DI packet" as a protocol referring to that at least one of the packets is adapted to comprise the DI information selected from the group consisting of system DI, hardware DI, software DI, any of their conversions, and any of combinations of their individual component IDs, to be elaborated under the section entitled "Cybersecurity Operating System for Enabling DI Communication" hereinafter in conjunction with FIG. 6.

Referring again to FIG. 1, when received through communication connecting means 180, the punitive cybersecurity system requires at least one of the packets issued from a remote or personal communication device (such as Wi-Fi device or router 132 and NearLink 132A, computer 131, 133, 133H, 136, tablet 137, smartphone or cellphone 134 and 135) to be the DI packet containing DI information before any communication can be established.

Furthermore, PCS 100 may be rendered to achieve the first primary preferred embodiment by (i) integrating cybersecurity protection means 190 to Internet communication systems 110A, 110B, or 110C or (ii) installing a software program or operating instructions of the present invention to a website host provider or web hosting service such as ISP, NSP/MAE/NAP103, data centers 104, Internet communication unit 101A, 101B or 101C, memory-storage means 102A or 102B, or any of their combinations.

Internet communication unit 101A, 101B or 101C and cybersecurity protection means 190 are mainly for providing the punitive cybersecurity protection on a large or even global scale. Each of them comprises its own memory means, control system with a microprocessor, communication means, and operating instructions. Exemplary implementations include a single integrated circuit board (i.e., system-on-chip SoC) or a device unit assembled with various components integrated with communication circuitry, memory circuitry or storage, firmware, ROM, embedded chip, versatile memory, SRAM (static random-access memory) chip or module, instruction set, app, platform, operating system and/or any of their combinations. On the other hand, a personal communication device (such as computer 131, 133, 133H, 136, tablet 137, smartphone or cellphone 134 and 135, autonomous cars or UAVs 140, and drones or UAS 145 situated remotely from the Internet communication devices) mentioned hereinabove in the layouts (vi) and (vii) will be internally implemented by installing an app of the present invention.

Punitive Cybersecurity Protection on Internet Communication Devices

Hereinafter recited are the Internet communication devices assigned to the layouts (i) to (vi). Situated in each unit of cybersecurity protection means 190 are communication means 191, memory means, operating instructions and a control system. The memory means stores a banned DI list of the remote personal communication devices to be banned from giving online access. The control system comprising at least one microprocessor in communication with the memory means is provided for executing the operating instructions and for controlling operation of communication means 191. Also stored in the memory means and available to the control system are the operating instructions for (i) allowing communication means 191 to start a first stage of communication in response to an incoming signal issued from a remote personal communication device requesting online access; (ii) elevating the remote personal communication device to a second stage of communication allowing online interacting on a webpage, if determining a DI packet from the incoming signal is received and not comprised in the banned DI list, wherein the DI packet comprises the device identification (DI) information of the remote personal communication device; (iii) imposing the punitive measure by disallowing the remote personal communication device to continue the online interacting, if detecting the online interacting involves an unwanted activity on the webpage; and (iv) updating the banned DI list with the DI information of the remote personal communication device identified to get involved in the unwanted activity.

The unwanted activity generally refers to any cyberattack or any activity being unauthorized, fraudulent, malicious, hacking, phishing or scamming, and/or employing adware, viruses, worms, ransomware, bots, Trojan horses, keyloggers, rootkits, spyware or cryptomining malware, and/or uploading/sending cyberattack files to the Internet as baits. These viruses and malware may be present in certain file types and extensions identifiable by some antivirus software programs such as Microsoft Defender, McAfee, Norton, and others.

Communication means 191 comprises communication circuitry connected to the Internet through wireless data transmitting (via cell tower 160A or 160B for instance) or wired data transmitting (such as communication connecting means 180). The communication circuitry is rendered operable to start the first stage of communication multitaskingly for processing a plurality of DI packets issued from a plurality of remote personal communication devices and to selectively elevate the communication to a second stage for allowing online access.

Preferably, the communication circuitry is able to multitaskingly establish communications through external communication connecting means 180 selected from the group consisting of at least one cable, at least one optical fiber, at least one hybrid fiber coax, at least one cellular phone channel, at least one satellite communication channel, at least one wireless communication channel, and any of their combinations, in response to a plurality of incoming signals to establish a plurality of the first stage of communications, for determining the presence of DI packet information.

In the present invention, the word of "stage" may express a status of communication. At the beginning, an incoming signal initially received will be momentarily held in the pending status to verify if the received signal has a DI packet and if the DI information contained in the DI packet is comprised in the banned DI list. When containing a DI packet with its DI information not comprised in the banned DI list, the incoming signal will enter the allowed status that is to flow through cybersecurity protection means 190 and to allow its online access request. All of the first stage and the second stage of communications may be processed by the same communication circuitry as an example.

On the other hand, the "stage" may refer to a physical stage or level, when communication means 191 comprises another communication circuitry for separately handling the DI packets in entering the second stage of communication by routing, forwarding, or linking in order to establish another plurality of outgoing communication links to the Internet data, while the DI packets initially received in the first stage of communication are handled by the first communication circuitry.

In brief, cybersecurity protection means 190 in conjunction with the processing of the incoming signals is hereinabove recited as an isolated security guard or a security gate that will preclude cybercriminals from obtaining any opportunity to attack the Internet data.

For an illustration purpose, cybersecurity protection means 190 in communication with memory-storage means 102A may be adapted to function as a central cybersecurity system, wherein its central banned DI list will be updated and synced preferably in realtime with other cybersecurity protection means 190 each having its own banned DI list as a result of encountering various cyberattack activities. When updated and synced in a global scale, the central banned DI list will impose the punitive measure of the present invention to ban, disallow, prohibit, or forbid any of the cybercriminals' devices from accessing any webpage, including any popular search engine such as Google, Yahoo, Bing, and others, financial institutions, banks, stocks, future and cryptocurrency trading platforms, webmails, cellphone messages and digital phone calls, downloads of apps from Google play and Apple stores, as a buyer or seller on Amazon and other E-commerce stores, government and other high-security websites.

Punitive Cybersecurity Protection on Personal Communication Devices

Now recited is the punitive cybersecurity protection on the layout (vii) referring to the personal communication devices such as computer 133, 133H, 136, tablet 137, smartphone or cellphone 134 and 135, in which each of them will be internally installed with an app of the present invention.

Contrary to attacking the Internet data or the online network by a personal computer, a cybercriminal may also utilize computer 133H as a server to host a website with luring contents aiming to ensnare personal communication devices as targeted victims for unlawful profits. A cybercriminal often repackages ransomware or malicious viruses pretending to be a well-known software program uploaded to BitTorrent network or torrent webpage waiting for a victim to take the bait. Alternatively, smartphone 134 may be utilized as a cyberattack tool for directly sending out the baits through bulk scam emails, text messages, or digital voice calls. The cybercriminal may further buy ads on other websites for posting luring ads with popup links.

The luring contents may be bundled with fake software, adware and may create a webpage carrying fake antivirus popup alert scams such as "Warning-your computer is infected! System detected virus activities. Click here to scan." The fake error message is a scam pretending to be legitimate from Microsoft or other well-known antivirus companies to trick a targeted victim into thinking that his/her computer has a virus detected. This creates a scare to the targeted victim into downloading and installing an unwanted or even malicious program on the computer. The software or "free scan" offered in popup alerts often doesn't work or actually infects the computer with a bundled dangerous program, instead of providing the protection it said to offer. This scam aims mostly to obtain personal credentials. Once the computer is infected, the scammer commonly gathers personal information so as to steal the targeted victim's credential information or to sell it to other criminals. The fake software may also be a deadly ransomware or a malicious cryptomining malware. Once mistakenly executed, the deadly ransomware will lock all files resided on all connected memory storage (including memory storage or NVMe modules, hard disks and solid state drives), until a demanded ransom is paid with cryptocurrency.

The malicious cryptomining malware will hijack an affected computer's resources for mining cryptocurrencies, in which the CPU and GPU power of the affected computer will be always fully exhausted to 100%, leaving nothing to the computer's owner for use. While the ransomware is known for no remedy except for paying the demanded ransom, the other fake antivirus, malware, adware, and cryptomining malware have a nasty reputation of being unable to be cleanly or successfully uninstalled.

The cybersecurity protection is applicable to wireless communication devices. Smartphone 135 may be considered to function as cybersecurity protection means 190 comprising communication connecting means (represented by wireless data transmitting through cell tower 160A or 160B for instance) connected externally to the Internet for data traffic to flow therewith. Situated in smartphone 135 are communication circuitry, memory means, operating instructions and a control system. The memory means stores a banned DI list of the Internet webpages or websites hosted by cybercriminal Internet servers. A cybercriminal may (i) host webpages or websites on a phishing server, (ii) send emails or text messages, short message service (SMS), multimedia messaging service (MMS), or video messaging in bulk each typically containing a link or attachment that has a fake login page of any appear-to-be trusted website such as a bank, antivirus subscription, online merchant, shipping company, and (iii) scam phone calls (to be further elaborated in a fifth primary preferred embodiment).

The cybersecurity protection is further applicable to personal communication devices referring to computer 131, 133, and 136. The control system of the personal communication device is rendered to achieve cybersecurity protection by installing the operating instructions of the present embodiment for controlling operation of communication circuitry and memory means accordingly. Specifically stored in the memory means and available to the control system are the operating instructions for (i) allowing the communication circuitry to establish a first stage of communication in response to an incoming signal issued from a remote Internet communication device, wherein the first stage of communication is to detect incoming signals and to determine if the incoming signal has a DI packet; (ii) elevating the incoming signal of the remote Internet communication device to a second stage of communication for allowing to receive a phone/video/text message/file, only if the DI packet is received and determined not to comprise the DI information contained in the banned DI list; (iii) allowing the personal communication device to submit the DI information of the Internet communication device (such as computer 133H exemplarily utilized by a cybercriminal as a cyberattack tool) to a remote central cybersecurity system having a central banned DI list, if the received phone/video/text/file is determined to get involved in committing a cyberattack, phishing or scam activity; and (iv) updating and/or syncing the banned DI list with the remote central cybersecurity system and then with the other personal communication devices participated in the cybersecurity protection, so as to impose the punitive measure sweepingly. Note that the "DI information" of the communication devices to be banned, referring to a plurality of DI information sets for its implication.

The remote central banned DI list may be resided on a third party sever system, in addition to the Internet communication devices such as punitive Internet communication systems 110A, 110B and 110C or cybersecurity protection means 190, the conventional ISPs, private server 131, website host providers, cloud computers, NSP/MAE/NAP 103 and deep sea data center/cloud storage 104 enforced with the present invention.

Punitive Cybersecurity Operating Method on Secured Internet Data

Figure 2:
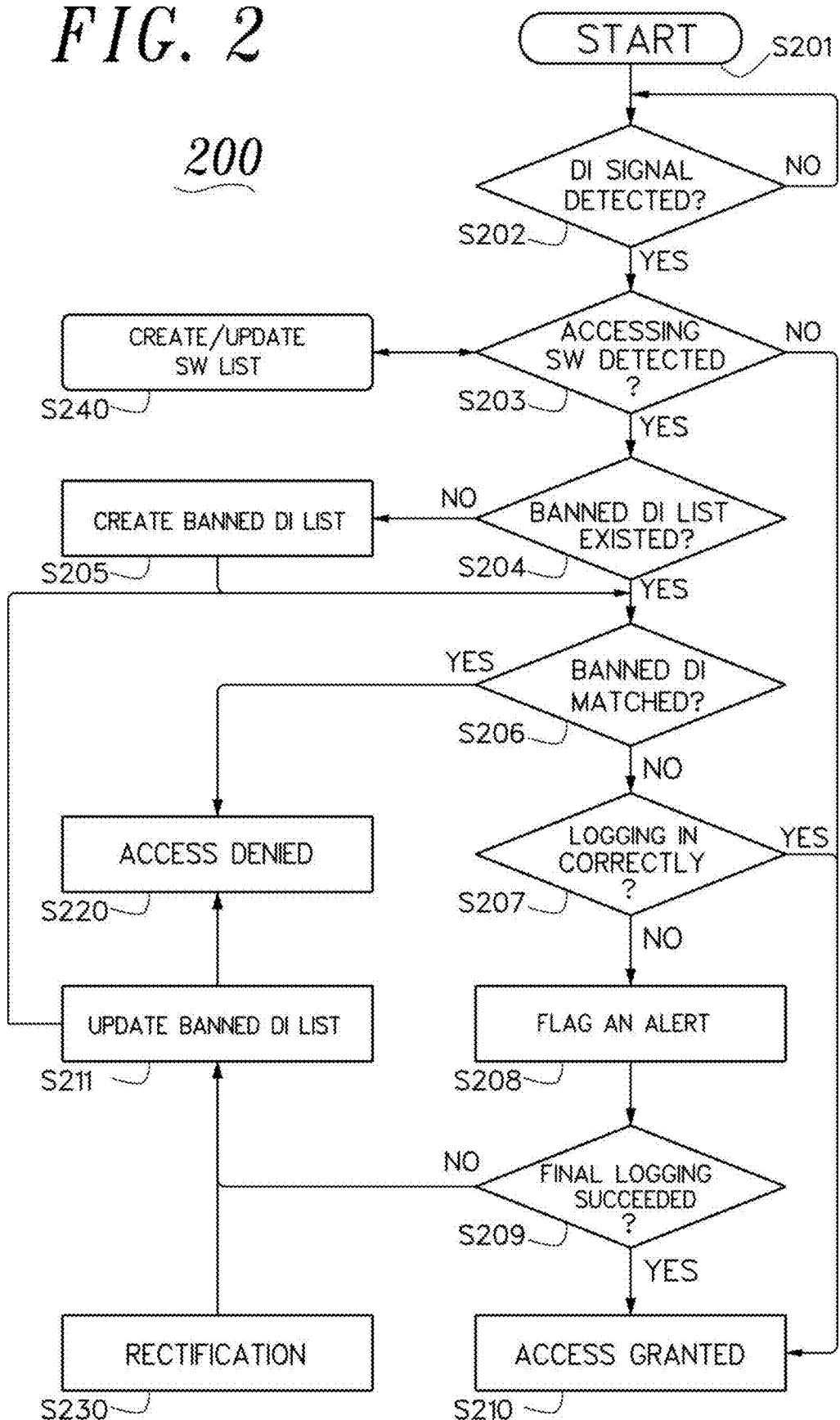
FIG. 2 is a flowchart reciting a cybersecurity operating method for punitively protecting secured Internet data in accordance with a second primary preferred embodiment of the present invention.

Now, cybersecurity protection means 190 is further elaborated in FIG. 2 as a second primary preferred embodiment of the present invention. More specifically, recited is a punitive cybersecurity operating method or process 200 to be implemented to cybersecurity protection means 190, to the Internet communication devices/systems, or to the personal communication devices previously defined. The punitive cybersecurity operating method may be in a form of an operating system, platform, app, software program, instruction set, and/or process for installation or implementation. It may be installed/loaded onto memory storage and executed by a microprocessor for implementing the embodiment.

Punitive cybersecurity operating method 200 will be illustrated in a flowchart comprising steps, instructions, or processes. The term "cybersecurity system" hereinafter generally refers to cybersecurity protection means 190, Internet communication unit 101A, 101B or 101C and the layouts (i) to (vii) implemented with punitive cybersecurity operating method, which will be multitaskingly executed on the main RAM circuitry of cybersecurity system referred in FIG. 1. Note that "S" stands for "Step" hereinafter.

Method 200 starts with Step S201, in which the cybersecurity system always provides a first stage of communication to an incoming signal containing bits in a form of packet issued from a remote personal communication device. Regardless of being in IPV4, IPv6 or newer protocol, at least one packet will be rendered to contain DI information. The conventional browsers relying on encryption such as HTTPS (Hypertext Transfer Protocol Secure) are unable to offer the punitive measure of the present invention. To implement the punitive measure, S202 is adapted to keep querying the remote personal communication device to respond with at least one DI packet, if an initially received packet is not a DI packet. Alternatively, a new web browser or protocol may be evolved into automatically formatting at least one packet into the DI packet of the present invention, when a personal communication device launches a browsing request. In short, S202 will detect or determine if a DI packet is present in an incoming signal submitted from a personal communication device.

S203 detects or determines if the incoming DI signal involves in accessing secured webpage (shown as "SW" in FIG. 2 and hereinafter). The SW detection may be occurred at the time when the webpage is visited. S240 creates/updates/provides a SW list of the Internet webpages and websites having SW nature. The SW list is preferably a table or registry of the Internet IP addresses or URL address information of the SW webpages stored on cybersecurity protection means 190 (isolated from the SW data), thus stopping a cyberattack at the very earliest stage even before giving any accessing opportunity to the SW webpages.

When the SW accessing is detected, S204 further checks if a banned DI list exists. The banned DI list contains a tabulation or registry of the communication devices previously denied to the SW accessing. By searching the banned DI list, S206 can easily determine if the incoming signal contains DI information having a match to the entries on the banned DI list. If the DI information doesn't have a match with the banned DI list, the incoming signal will be elevated to a second stage of communication that is to grant access to the SW website or webpage for proceeding with a login process, S207. If correctly logging in, a user will be further granted with an access permission to other SW webpages of the website, S210. If not, S208 flags an alert to further monitor the user's subsequent login activities. The number of allowable failed login attempts may be set by the SW websites or by a preset value at S208. Access is granted if the final login step at S209 determines to be successful. If not, S211 will add the DI information of the incoming signal to the banned DI list, performing an update. Followed is a denied access S220. The banned DI list upon update will feed back for use at S206, thus applying the banned DI list to other SW websites.

Preferably, the update includes to sync the banned DI list with a central banned DI list situated on a central punitive cybersecurity system. As a result, the banned DI list will impose the punitive measure of the present invention by banning an identified communication device to access any SW webpage on the Internet sweepingly.

Should there exist a mistake from a user login activity, S230 provides a rectification step to remove the entry of a mistakenly denied DI information set from the banned DI list at S211. The rectification step S230 shall be initiated from the mistaken user by manually contacting (mostly via a phone call) an associated website authority to undergo an inhouse verification process. The rectification process S230 doesn't create any extra effort to the mistaken user, as it is conventionally necessary to call a credit card customer service representative authorized to issue a rectification request from S230 to S211. Alternately, a digital rectification process may be employed by linking the mistaken user's known identification information (such as an email address/account or cell phone digitally reachable and other credential questions and answers) on file for proceeding with a verification confirmation.

Punitive Cybersecurity Operating Method on Public Internet Data

Figure 3:
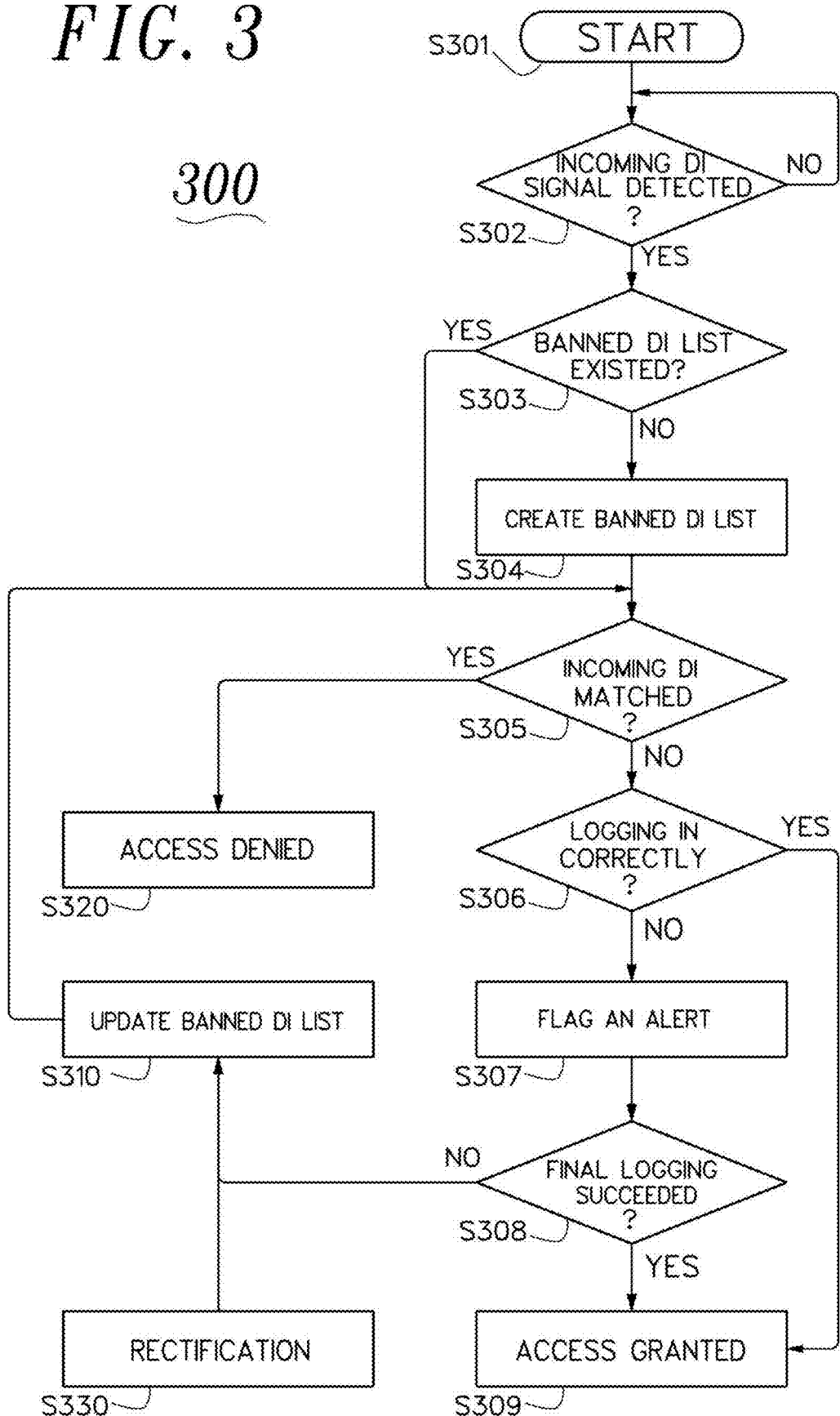
FIG. 3 is a flowchart reciting a cybersecurity operating method for punitively protecting global Internet data in accordance with a third primary preferred embodiment of the present invention.

Elaborated in FIG. 3 is a cybersecurity operating method 300, in which a cybercriminal's communication device will be banned from accessing the Internet system or the layouts (i) to (vi) implemented with the present embodiment, even on non-secured websites or webpages. Starting with the step S301, method 300 provides a first stage of communication to an incoming signal issued from a remote personal communication device requesting access the Internet system, for obtaining the DI information. S302 is to determine if the incoming signal contains a DI packet. If not, it will keep querying for a DI packet from the remote personal communication device. During the initial implementation of the present embodiment, a banned DI list will be created by activating S303 and S304. The banned DI list may be obtained by downloading a copy from a remote central cybersecurity system. Another exemplary building/creating DI list process will be given under the section entitled "Cybersecurity Operating System for Enabling DI Communication" later. Any incoming DI packet will be checked to see if its device identification information has a match with the banned DI list S305. Any Internet access request from a remote personal communication device having a match with the banned DI list 305 will be denied at S320.

If there is no match at S305, the remote personal communication device will be elevated to a second stage of communication, which may be exemplarily followed with a step of S306 determining if its login onto a secured website or webpage is correct or not. If not, S307 flags an alert and follows with S308 monitoring its subsequent login attempts. If the login is correct, access will be granted S309. A failure at S308 will invoke S310 to update a new entry of the DI information to the banned DI list. A rectification step S330 is also provided, should there exist a mistake in login from a user. Consequently, any new cybercriminal's communication device once identified at S308 and updated at S310 will be fed the latest banned DI list back to S305 to ban access on any other public webpage. In essence, method 300 will totally deprive the Internet access functionality of a cybercriminal's communication device.

The banned DI list created at S304 for the communication devices to be banned in FIG. 3 is preferably DI information comprising (i) Internet IP addresses, domain names for servers or Internet webpages deployed by a cyberattacker, and MAC addresses, (ii) hardware device identification (hereinafter "hardware DI") or serial number embedded such as system product ID, UUID (Universally Unique Identifier), machine ID, CPU ID, wired and/or wireless circuitry such as router, Ethernet, Wi-Fi, NearLink, Bluetooth, NFC and UWB, Basic Input/Output System firmware chip (BIOS, EFI, or UEFI), motherboard or baseboard/system board/mainboard, system product, GPU (video or display), RAM memory module, memory storage drive (or disk drive), NVMe module, Video, Monitor, communication DI such as cellphone or Mobile Equipment IMEI/IMEISV/ICCID/IMSI/Mobile Broadband Service card number; (iii) software DI such as device OS (operating system) installation ID, OS licensing ID, OS activation key, software program serial keys, or (iv) any of their combinations.

In brief, the third embodiment recites a punitive cybersecurity operating method providing cybersecurity protection, comprising (a) building a banned DI list for the communication devices to be banned from giving online access; (b) in response to an incoming signal issued from a communication device, obtaining the DI information of the communication device; (c) granting online access on a webpage of an Internet system, only if the DI information is obtained and not comprised in the banned DI list; (d) banning the online access, if detecting the communication device involved in an unwanted activity on the webpage; and (e) adding the DI information of the communication device involved in the unwanted activity to the banned DI list.

The punitive cybersecurity operating method as recited hereinabove is for providing cybersecurity protection to an Internet system that hosts a plurality of websites to be accessed. The update step at S310 further comprises syncing the banned list with other Internet systems participated in the cybersecurity protection. Thus, any communication device with its DI information once identified to get involved in the unwanted activity on one Internet system will be sweepingly banned by all of the other Internet systems as the punitive measure.

In brief, method 300 will deprive the Internet-access capability of cybercriminals' communication devices. As defined previously, DI information comprises available Internet or public IP address, domain name and/or specific URL address information if a server or Internet webpage is deployed by a cyberattacker, which are summarized as system DI, hardware DI, software DI, any of their conversions, and any of combinations of their individual component IDs. Once identified, a cybercriminal's server will be rendered inoperable of accessing the Internet. In addition, the punitive measure will further deprive the reusability of its hardware devices and per-machine-based operating system once registered in the banned DI list.

With the DI information recited, cybersecurity operating method 300 is equally applicable for providing cybersecurity protection to a personal communication device such as computer 131, 133, 133H, 136, tablet 137, smartphone or cellphone 134 and 135, autonomous cars or UAVs 140, and drones or UAS 145 (as depicted in FIG. 1) for personal usage, against a cybercriminal's phishing or scamming server that hosts fraudulent Internet websites or fake software waiting for the baits to be taken.

In addition to monitor the cyberattack activities on the secured webpages as one of the unwanted activities, method 300 may further comprise another step for detecting if the personal communication device commits uploading a file bundled with malicious programs such as adware, viruses, worms, ransomware, bots, Trojan horses, keyloggers, rootkits, spyware, and cryptomining malware.

Punitive Cybersecurity Operating Method on DI-Member-Only Network

Figure 4:
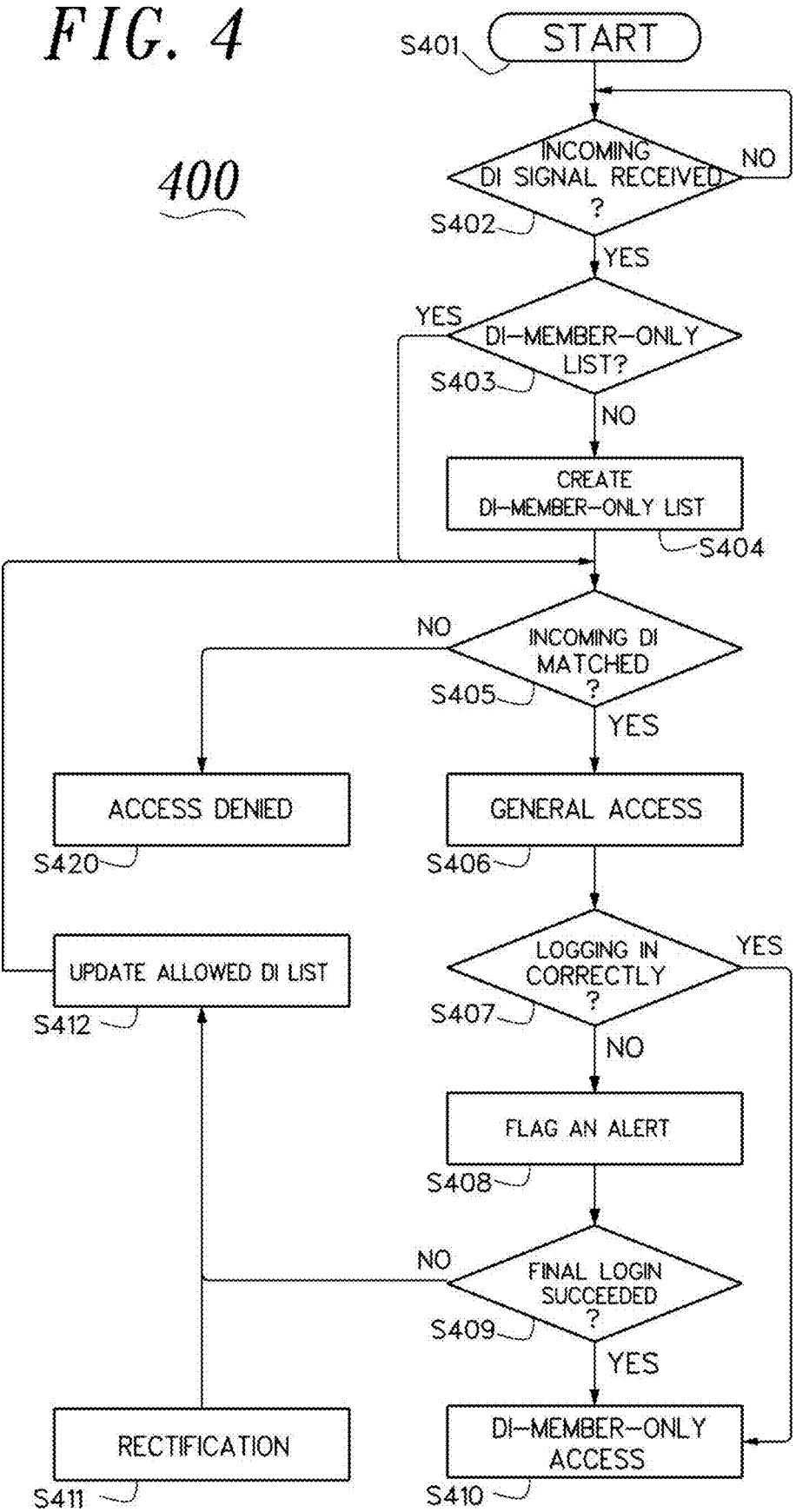
FIG. 4 is a flowchart depicting an operating method for providing DI-Member-Only network in accordance with a fourth primary preferred embodiment of the present invention.

Referring now to FIG. 4, a fourth primary preferred embodiment is a cybersecurity operating method 400 providing a secured/closed/enclosed private network with flexibility beyond the conventional practice. In the conventional Internet networking, the terminology of "private network" is defined as a computer network that utilizes a private address space of IP addresses for local area networks (LANs) commonly seen in residential, office, and enterprise environments. Both the IPV4 and the IPV6 specifications have defined a particular narrow range for the private IP addresses. However, the conventional private network is confined to a specific nearby location and has to be locally connected. In contrast, the present embodiment advances to a "DI-Member-Only" network, referring to "device identification based member only" network.

The DI-Member-Only network defines its online access is restrictedly limited to the communication devices that has DI information predefined, preselected, or preregistered in the network for establishing device-ID-member-only security. In contrast to the private network, the DI-Member-Only network is not relying on the private address space conventionally defined. Thus, the communication devices participated in the DI-Member-Only network may be situated at various sites remotely, in the cloud storage, or in traveling/moving. Their connections of networking may thus be achieved by the Internet, rather than relying on the physical infrastructure of local LAN cables utilized in the conventional private network. Thus, each of the communication devices within the DI-Member-Only network can access the Internet and can thereon establish the secured/closed/enclosed private networking to each other.

Exemplary applications are the secured access to the DI-Member-Only network (including on servers or in the cloud storage) from home office or any different ISP during traveling or in moving for establishing secured/closed/enclosed private communications for military or civilian applications, secured group meetings or video conferences on top of data or document transferring, as long as a DI-Member-Only communication device is utilized.

DI-Member-Only operating method 400 starts with S401 always allowing a first stage of communication for an incoming DI signal S402 to be received. If DI-Member-Only list doesn't exist at S403 before the initial setup of method 400, it will allow an authorized administrator to create one at S404 in accordance with the communication devices to be enclosed. DI-Member-Only list S403 comprises the DI information (previously recited) of the communication devices that are predefined, preselected, or preregistered for the secured DI-member-only network application. In essence, a match to the DI information is a prerequisite for any communication device to be able to access or to establish the DI-Member-Only network connection.

The incoming signal S402 in FIG. 4 is also required to contain at least one DI packet mentioned above. S403 determines if the DI information of the incoming DI packet signal has a match to DI-Member-Only list. If no match at S405, any attempt to access the DI-Member-Only network will be denied S420. If matched, the communication device will be allowed to proceed with a second stage of communication including a general or public access S406 within the DI-Member-Only network, or a direct access to a personal account. Further provided are login steps that include S407 determining if a login is correct, S408 flagging an alert if necessary, and S409 determining if a final login is succeeded, in order to enhance further cybersecurity protection in case a DI-Member-Only communication device is lost or stolen, and to obtain other purposes such as gaining an elevated privilege in higher-level security access or in confined group access S410 (DI-Member-Only Access). Optionally provided is a rectification step S411. DI-Member-Only list S403 can also be updated S412 for a new communication device to be joined or removed.

Within the DI-Member-Only network, established are the DI-Member-Only connections for applications such as web or Hypertext Transfer Protocol (http, and https), e-mail (SMTP, POP, IMAP), file transfer (FTP), remote login to hosts or remote terminals (Telnet, Secure Shell), Mobile Equipment ID (IMEI/IMEISV/ICCID/IMSI/Mobile Broadband Service card number), video and audio transferring and others. In essence, the fourth primary preferred embodiment precludes any online access from unknown communication devices and thus extinguishes any potential cyberattack through delivered bulk spam emails, attached Trojan horse viruses or malware. The embodiment of the DI-Member-Only network is particularly suitable for the applications in need of controlling the classified information with absolute cybersecurity protection required by government, military, intelligence, top secret research organizations, financial institutions, bank-to-bank transitions, cryptocurrency transitions, corporate internal sensitive documents, and personal secrecy in the cloud.

Cybersecurity Protection on Scam Phone Calls and Messages

Figure 5:
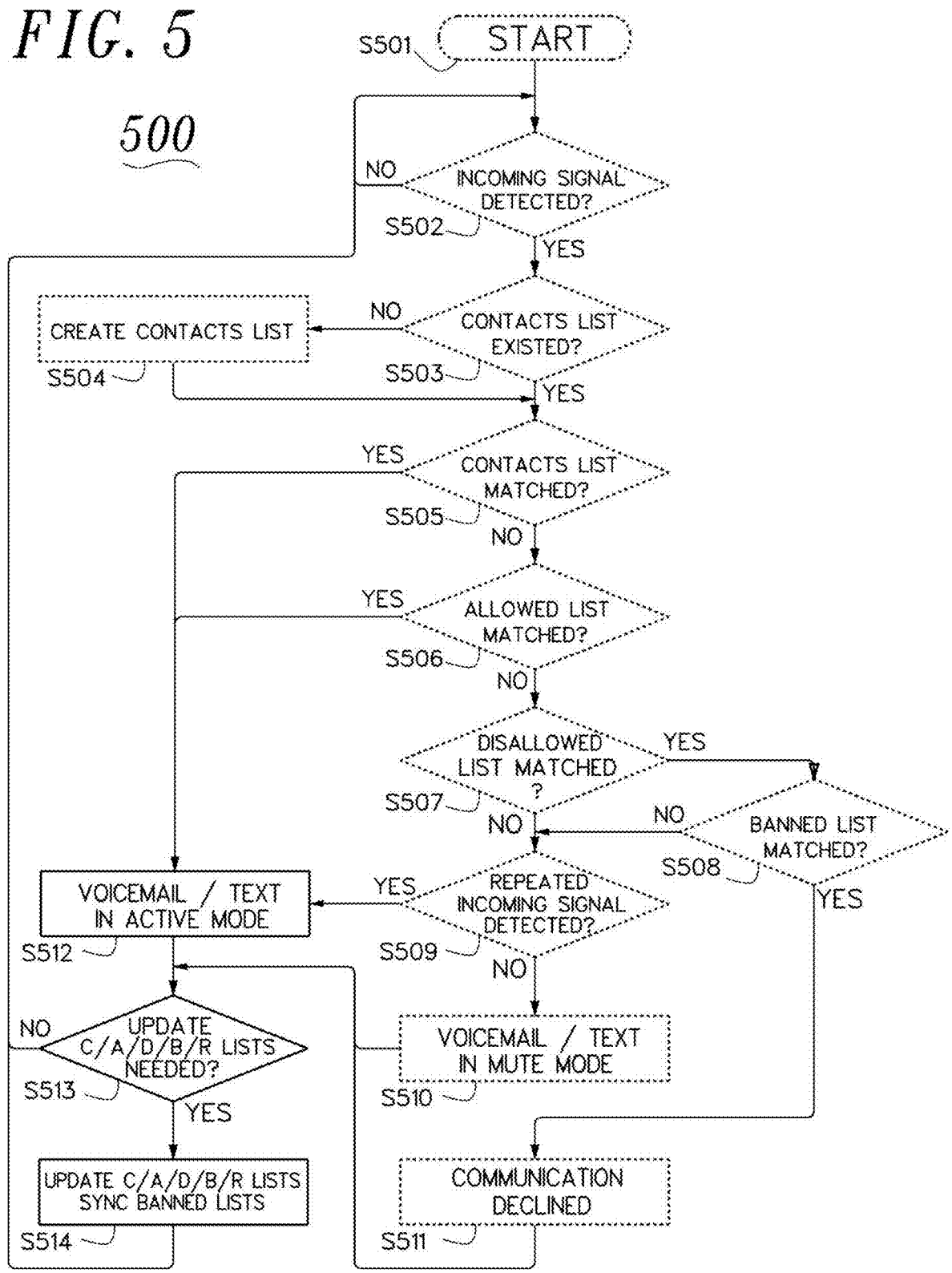
FIG. 5 is a flowchart of operating method providing cybersecurity protection to smartphones in accordance with a fifth primary preferred embodiments of the present invention.

Shown in FIG. 5 is a fifth primary preferred embodiment, aiming to deal with scam phone calls and messages. Without the present invention, a conventional smartphone will instantly enter its active mode signifying at least a visual notification, even when receiving a scam incoming signal. If there is a scam shield app installed, the conventional practice is to block all scam-like phone calls with a visual notification popup shown "a scam-like call blocked" in active mode, in which the owner of the conventional smartphone is unnecessarily alerted and has no option to determine if it is a mistakenly blocked incoming call or not.

The present embodiment may also utilize two stages of communication, but with different arrangements: (i) a first stage of communication in mute mode defined hereinafter to process an incoming signal of a phone call without making any audio/visual/vibration notification, wherein the first stage further includes making a decision to handle the incoming signal contingently, and (ii) a second stage of communication in active mode defined hereinafter to signify an audio/visual/vibration notification (including any of their combinations) to which prompt attention should be given while the incoming signal lasts.

FIG. 5 is further depicted in the dashed blocks from S501 to S511 referring to the first stage of communication in mute mode, and in solid blocks from S512 to S514 referring to the second stage of communication in active mode. The embodiment may not require any assistance or management remotely from a central system nor a third-party central server, just by installing an app of the present embodiment onto each of the smartphones to be implemented accordingly.

On a smartphone implemented with the present embodiment, method 500 starts with S501 silently waiting for use. In response to an incoming call or message, the smartphone will enter the step S502 in the first stage of communication or in mute mode.

The signal applicable to the smartphones in accordance with the fifth primary preferred embodiment also includes any incoming radio frequency, for example NFC (Near Field Communication) at an operating frequency of 13.56 MHz. Hacker may modify various hacking gadgets available in the market for hacking NFC enabled smartphones for illegal profits. Thus, any incoming signal without ID information received at S502 will be rejected automatically, and will go back to the starting step S501 in accordance with FIG. 5.

If the incoming signal carrying the caller or the text message sender ID, followed will be S503 checking if a contacts list exists on the smartphone. The contacts list comprises the phone numbers and ID (identification) information such as names, phone numbers, email addresses, social network media accounts and/or a string of characters contained in the contacts of the smartphone. During the initial installation of the app, the contacts list will be created by importing the phone numbers or ID information of the contacts at the step of S504, for facilitating the performance of the app.

Followed with S503 will be sequentially compared to see if it has a match with (i) the contacts list S505 to be allowed always, (ii) an allowed list S506 comprising the contacts list S505 and others not on the contacts to be allowed, (iii) a disallowed list S507 to be disallowed, (iv) a banned DI list S508 to be always banned, in which any incoming signal/call disallowed twice will be moved to the banned list S508, and (v) a repeated list S509 to be proceeded contingently in conjunction with the disallowed list, in which it will alter the disallowed handling of an incoming call on the disallowed list.

The disallowed list S507 may be created or updated by the owner of the smartphone or synced by a remote central system. The IDs of unwanted phone calls and/or messages mainly for promoting commercial ads will be added to the disallowed list S507. When a signal/call/message ID disallowed twice by the same smartphone owner or appears at least twice from different smartphone owners reported to the central system, it has a bad reputation and will be moved to the banned list S508. Alternatively, the central system may perform the validation of the disallowed list received from the smartphone. The banned list S508 refers to the IDs associated with the scammers and/or phishers to be permanently banned. Different from the commercial ads, the scamming/phishing phone calls and or messages are intentionally fraudulent and malicious, which is becoming prevalently rampant in Asian countries. The scammers/phishers may also deploy AI to make voice and video replicas of a friend or relative of a victim for conducting a video phone scamming or phishing.

The repeated list at S509 refers to incoming DI information including caller or text message sender IDs that appear at least twice. If the answers from S505 to S509 are all resulted in NO, it means that the incoming call or text message ID is unrepeated from an unfamiliar but not-disallowed and not-banned. Thus, followed will be the step of voicemail/text S510 for leaving a voice recording or text message in mute mode even when the conventional time-dependent "Do Not Disturb" is turned off during the daytime. The voicemail/text step S510 resulted from S505 through S509 will allow a good but unfamiliar person to leave a message selected from the group consisting of a voicemail, a text message, a multimedia message, a video message, and any of their combinations. A scammer is normally reluctant to leave a traceable phone number or ID information on voicemail or text message for verification.

When matched with the disallowed list at S507, the incoming signal will be further determined if it is comprised in the banned list S508 or not. If comprised in the banned list S508, activated will be S511 to decline the communication request. Based on the repeated list, S509 allows a disallowed once but repeated incoming signal to be giving an opportunity for leaving a voicemail or text message. So that the owner of the smartphone can determine if it is to be moved to the banned list or to the allowed list from the disallowed list.

In brief, the first stage of communication will automatically and selectively enter in mute mode or even time-independent Do Not Disturb mode that is even when the conventional time-dependent "Do Not Disturb" is turned off during the daytime, comprising (i) the ID verification step for all incoming signals received at S502, which will reject (ii) the C/A/D/B/R (contacts/allowed/disallowed/banned/repeated lists) classifying steps S505 to S509, (iii) the voicemail/text recording step S510 for dealing with the unrepeated incoming signal from any unfamiliar but not-disallowed ID (referring to not listed in the disallowed ID hereinafter), or any disallowed once but not banned ID, (iv) the voicemail/text recording step S510 for handling the disallowed once but repeated call, and (v) the decline or rejection step S511 for banning the incoming calls comprised in the banned list.

The second stage of communication in active mode S512 will issue an audio/visual/vibration notification for alerting an incoming call or for leaving a text message or voicemail with an audio/visual/vibration notification, when the incoming call has its ID matched with (i) the contacts list S505, (ii) the allowed list S506, and (iii) the repeated list without the disallowed list S509. When an incoming call dialed in twice from the same unfamiliar person, it signifies an urgency of the repeated caller, which is mostly not from a scammer. S513 and S514 allow to update or edit the C/A/D/B/R lists referring to the contacts, the allowed, the disallowed, the banned and the repeat lists, manually by the smartphone owner or automatically by the app. Based on voicemails or texts left in mute mode S510, the smartphone owner can readjust the disallowed but repeated ID information to the allowed list for entering the active mode in the future or moved to the banned list to be banned at S511. At the end, method 500 will go back to S501 and S502 waiting for processing another incoming signal.

The present embodiment is also applicable to handling the situation when the incoming signal at S502 refers to a text message, short message service (SMS), multimedia messaging service (MMS), or video message. The voicemail/text step at S510 resulted from S505 through S509 will allow a message to be left in mute mode for (i) an unfamiliar but not-disallowed ID and/or (ii) a disallowed once, but not-banned (referring to not listed in the banned ID hereinafter), and repeated ID. On the other hand, in active mode of communication S512, an audio/visual/vibration notification will be issued from the smartphone, when the incoming text message is sent by a person (or a smartphone or a computer) with an ID matched with the contacts list S505, the allowed list S506, or the repeated list S509.

Further, the step of S514 is rendered to update and sync the banned list on the smartphone with a central banned DI list on a central system of a provider or a third-party central server, which will verify the validity of the to-be-added banned DI information received from the smartphone. The central banned DI list will be further synced with other smartphones implemented with the present embodiment. Consequently, the present embodiment provides the cybersecurity protection to preclude a scam phone call or a scam message initiated by any identified communication device from being sent to other smartphones implemented with the cybersecurity protection, so as to achieved the punitive measure sweepingly.

Contrary to the present embodiment, the conventional practice has to place a smartphone either in the "Do Not Disturb mode" during the nighttime, or in normal operation during the daytime by turning off the "Do Not Disturb" mode. Evidently, the conventional practice will be unable to proceed with the mute mode of the present embodiment automatically during the daytime.

In summary, the present embodiment will render a smartphone selectively operable in the active mode and in the mute mode automatically and contingently during the daytime in normal operation, which may replace the conventional "Do Not Disturb" mode conventionally executed during the nighttime. Especially, the present embodiment may allow to give a prompt attention at night for not missing any emergency phone call from the contacts list.

Cybersecurity Operating System for Enabling DI Communication

Figure 6:
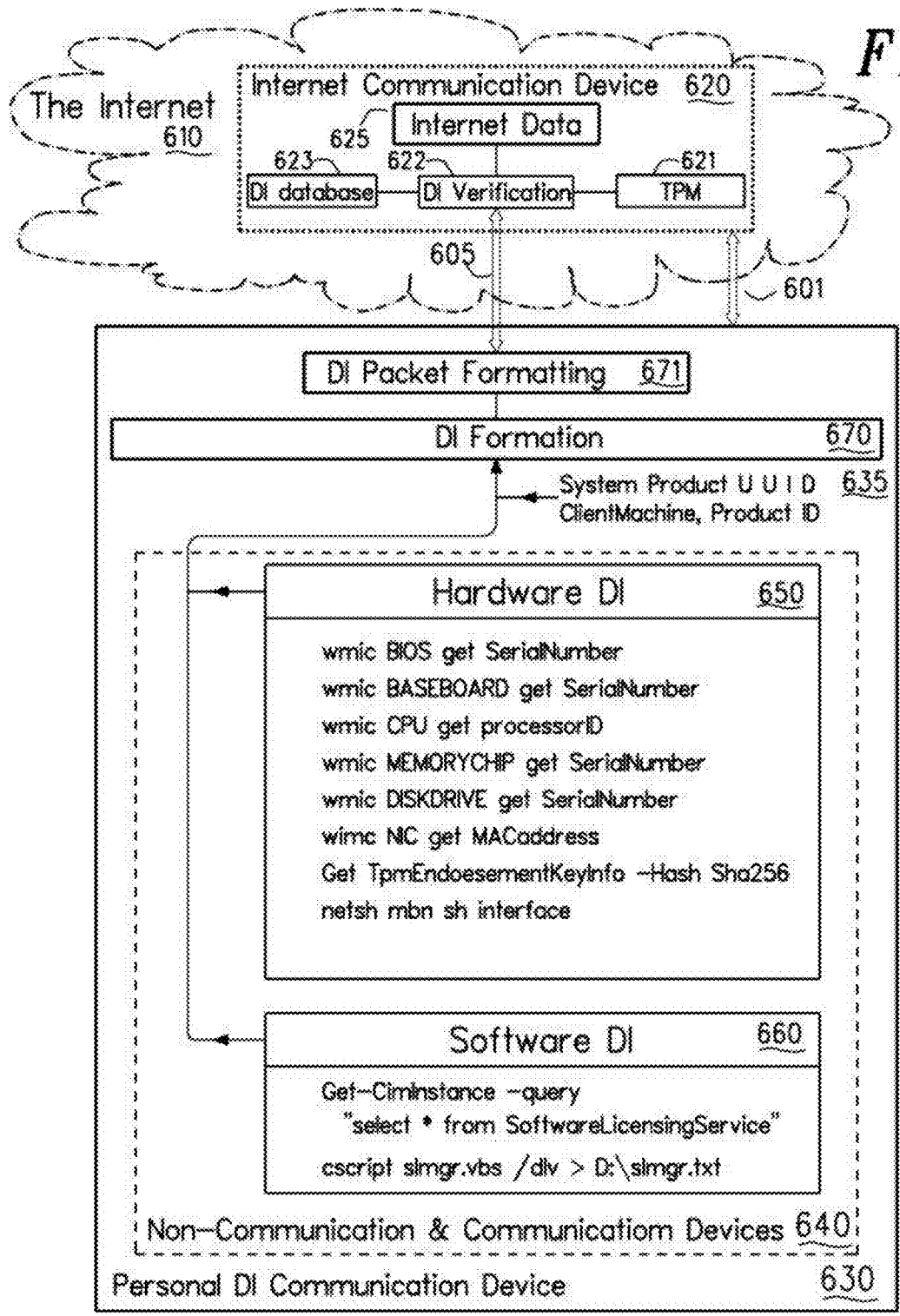
FIG. 6 depicts a punitive cybersecurity operating system for enabling DI Communication in accordance with a sixth primary preferred embodiment of the present invention.

FIG. 6 depicts an exemplary diagram of a sixth primary preferred embodiment showing DI operating system 600 that provides cybersecurity protection by establishing DI communication 601 between Internet communication devices 620 (providing Internet data to be accessed) and personal DI communication devices 630 (accessing the Internet communication devices or browsing the Internet data), and thus for imposing punitive damages to cybercriminals and cyberterrorisms.

DI communication 601 is more specifically provided for bridging (i) the Internet 610, (ii) Internet communication devices 620, and (iii) personal DI communication devices 630 with DI operating system 600 installed thereon. Resided on Internet communication devices 620 each comprises TPM 621, DI verification 622 and DI database 623 for providing the punitive cybersecurity protection through DI communication 601 to Internet data 625. TPM 621 may refer to other security architectures such as Trust Zone Address Space Controller (TZASC) for a single integrated circuit board or the so-called system-on-chip SoC.

Personal DI communication device 630 is an integration of non-communication and communication devices 640 including (i) hardware devices or components microprocessor/MPU/CPU, GPU, RAM, memory circuitry or storage, firmware, ROM, TPM, embedded chip; and communication means such as communication circuitry such as router, Ethernet, Wi-Fi, NearLink, NFC, and Mobile Equipment including IMEI/IMEISV/ICCID/IMSI/Mobile Broadband Service card, and (ii) software such as operating instructions, apps, platform, and/or operating system.

In brief, depicted in personal DI communication device 630 are three major DI information: (i) system DI 635, (ii) hardware DI 650, and (iii) software DI 660.

System DI 635 exemplarily includes csproduct (Computer System Product) ID or UUID (Universally Unique Identifier) 635, ClientMachineID, ProductID and MachineID, which are either embedded or assigned during OS installation. With administrator privileges elevated, a cmd prompt of "wmic csproduct get identifyingnumber, uuid" will reveal csproduct ID and UUID 635. Other exemplary cmd prompts are (i) "Get-CimInstance-ClassName SoftwareLicensingService" for retrieving ClientMachineID; (ii) "wmic os get serialnumber" for revealing ProductID; and (iii) "reg query HKEY_LOCAL_MACHINE\SOFTWARE\Microsoft\SQMClient/v MachineId" for showing MachineID.

Hardware DI 650 representing the collection of hardware device information may be revealed by various utility apps, such as HwiNFO, System Information (from Windows manager), or by executing "msinfo32" or various command lines using Windows as an exemplary operating system. Retrievable core hardware DI 650 shown in FIG. 6 include (i) "wmic bios get SerialNumber" for getting BIOS serial number; (ii) "wmic baseboard get serialnumber" for getting the serial number of a motherboard or baseboard/system board/mainboard; (iii) "wmic CPU get processorID" for getting microprocessor/MPU/CPU ID; (iv) "wmic memorychip get serialnumber" for getting the serial numbers of RAM memory modules; (v) "wmic diskdrive get SerialNumber" for getting the serial numbers of memory storage drives or NVMe modules; (vi) "wmic nic get MACAddress" for getting Ethernet and Wi-F MAC addresses; (vii) "Get-TpmEndorsementKeyInfo-Hash Sha256" for getting TPM ID such as TpmEndorsementKey, publicKeyHash, serial number, and Thumbprint; and (viii) "netsh mbn sh interface" for getting Mobile Broadband Service.

In brief, hardware DI 650 may include Internet IP addresses, domain name, URL address information, MAC addresses of wired and/or wireless circuitry such as router, Ethernet, Wi-Fi, NearLink, Bluetooth, NFC and UWB, Mobile Equipment ID (such as IMEI/IMEISV/ICCID/IMSI/Mobile Broadband Service card number), phone number, BIOS (Basic Input/Output System), motherboard/baseboard/system board/mainboard, microprocessor/MPU/CPU, GPU/graphics processing unit, RAM modules, memory storage drives (or disk drives), NVMe modules, TpmEndorsementKey/TPM module, and monitor.

The well-known term "BIOS" used in the present invention is generally referring to the architecture of the platform firmware used for booting and interfacing components in interaction with the operating system. It exemplarily represents not only the old BIOS, but its successors such as EFI (Extensible Firmware Interface), UEFI (Unified Extensible Firmware Interface), and others in the same class. Examples of the firmware utilized the modern UEFI specification are AMI Aptio, Phoenix SecureCore, TianoCore EDK II, InsydeH₂O, and others.

Software DI 660 refers preferably to the core software programs or operating systems having software licensing services implemented on a per device basis. The uniqueness of those serial numbers or activation keys of the per-machine-based OS or core software programs will further enhance the punitive cybersecurity protection. Running a cmd in powershell "Get-CimInstance-ClassName Software-LicensingService" will reveal Windows licensing keys and ClientMachineID. Another exemplary cmd prompt is "cscript slmgr.vbs/dlv>D: \slmgr.txt" for retrieving various Windows OS licensing information, such as OS license, activation ID, application ID, installation ID, and product key to a file named slmgr.txt on D drive.

Also may be as a constituent in the DI information is the computer/device OS licensing ID or activation key maybe stored in memory storage during an OS installation process from a user or embedded in a memory means from OEM. Another OS antipiracy conventionally utilized is to employ a digital license linked to Microsoft account, iOS Apple ID, or other software developer servers. The newer Windows computer for instance may have an OEM product key embedded into its BIOS (including old BIOS, EFI or modern UEFI). The integration of the software DI with the software developer servers will advance the implementation of the present invention to exert the punitive measure sweepingly, further rendering any communication device (including a computer, tablet, laptop, or server) inoperable completely once identified to get involved in a cyberattack.

The punitive measure may also be implemented further by sending and executing for example a Windows command prompt "TASKKILL/IM svchost.exe/F" to a cybercriminal's computer or personal communication device, so as to instantly trigger a Windows BSOD (the Blue Screen of Death). The BSOD will abruptly and unanticipatedly crash the cybercriminal's cyberactivities as another punitive measure, rendering cybercriminals' efforts fruitless in addition to the incurred punitive damages.

Also included in software DI 660 is a digital key or unique serial number such as biometric data ID for authentication that utilizes the unique biological characteristics of a person by comparing live biological data (such as eyes ID, face ID, fingerprint, voice ID and others) to biometric indicator data stored on file, i.e., on the Internet communication device, for a match. It is unnecessary for a personal communication device or PC to possess a hardware biological chip for detecting the live biological data as long as the digital key is "uniquely" created and/or encrypted and tied to its communication device. This is similar to TPM TpmEndorsementKey, publicKeyHash, serial number, or Thumbprint, regardless of being encrypted or not.

In brief, software DI 660 may include device OS licensing information, such as OS license, serial numbers, activation keys, activation ID, application ID, installation ID, digital license linked to software developer server (such as Microsoft account, macOS Apple ID, Google account, HarmonyOS, Baidu account, WeChat, Facebook, Twitter, and others), Client Machine ID, machine ID, Product ID, user account linked to software developer server for account verification (such as email accounts, phone numbers, virtual phone numbers, and passwords), social network media accounts, digital keys, biometric data (such as fingerprints, voice ID, eyes ID and face ID), and any of their combinations. Those are also applicable to other operating systems such as HarmonyOS, macOS, Linux, and Android for instance.

With the DI information elaborated hereinabove, the operation of the DI operating system 600 in FIG. 6 will now be evidently elucidated hereinafter. DI operating system 600 is mainly for enabling DI communication 601 that comprises building DI database 623, setting DI formation 670 for specifying the DI information to be received and/or comprised, effectuating DI packet formatting 671, and transmitting the DI packet 605. For facilitating the illustration, DI formation 670 and DI packet formatting 671 are depicted exemplarily on personal DI communication device 630. Both DI formation 670 and DI packet formatting 671 can be achieved by installation of an app, an add-on extension (to the existing browsers) or a new browser of the present invention to personal DI communication device 630. Alternatively, operating instructions may also be installed on both Internet communication device 620 and personal DI communication device 630 for the DI communication. The DI information of personal DI communication devices 630 being allowed for retrieving by or for submitting to Internet communication devices 620 is a prerequisite for Internet data 625 to be accessed without being maliciously attacked by cybercriminals.

DI formation 670 will build a set of DI information of a communication device, selectively from any of combinations of their individual IDs mentioned in (i) system DI 635 such as csproduct ID or UUID, ClientMachineID, ProductID and MachineID, (ii) hardware DI 650, and (iii) software DI 660. A maximum of DI formation 670 will render a cybercriminal's personal communication device, all of its hardware components and device software programs inoperable totally if it is detected to get involved in a cyberattack.

DI formation 670 may further assign the DI information with an indexing ID. ClientMachineID or UUID may be suitable as the indexing ID. Alternatively, the indexing ID of a communication device may be selectively derived from the group consisting of its Internet IP address, domain name, MAC address, system product ID, UUID, machine ID, microprocessor ID, OS licensing ID, OS activation ID, and Client Machine ID. Underneath the indexing ID are the detailed system DI 635, hardware DI 650, and software DI 660 in database.

Especially, invalidation of OS licensing ID, activation ID, digital license or product key, or ClientMachineID will deprive the OS functionality of the cybercriminal's personal DI communication device 630 and even its transferability to other new communication device.

In addition to the Internet protocol form without enciphering, DI packet formatting 671 may be rendered to comprise a conversion process selected from the group consisting of encoding, enciphering, hashing, and any of their combinations for formatting at least one DI packet into the string of bits as a digital fingerprint of the specified DI information determined by DI formation 670.

Registering all of hardware DI 650 to the banned DI list recited in FIGS. 1-6 will deprive any potential reusability on each of the non-communication devices or components, exemplarily listed in FIG. 6 such as Internet IP addresses, domain name, MAC/router/Ethernet/Wi-Fi/NearLink/Bluetooth, Mobile Equipment (IMEI/IMEISV/ICCID/IMSI/Mobile Broadband Service card number), Basic Input/Output System firmware chip (BIOS, EFI, or UEFI), motherboard, CPU, GPU/graphics processing unit, RAM modules, memory storage drives (or disk drives), NVMe modules, TPM module, and monitor for reuse as a part in rebuilding a new communication device.

Hereinabove the term "ID" (recited to detail the contents contained in system DI 635, hardware DI 650, and software DI 660) refers to identification/identifier/identity or serial number that may contain numbers, letters, character, and other typographical symbols, or may consist entirely of a character string.

In brief, the punitive measure created by the present invention for imposing punitive damages to cybercriminals and cyberterrorisms includes (i) disabling online or Internet access functionality of their communication devices, (ii) crippling their basic OS operation, and (iii) depriving the reusability of their hardware devices or components once registered in the banned DI list.

Accordingly, the punitive measure of the present invention will force a cybercriminal to purchase a brand new communication device and a new operating system, that is to financially incur punitive damages each time when a cyberattack activity is detected.

Aside from the punitive damages, the cybercriminal will be further forced to spend time and effort to set up new email addresses/accounts and cellphone numbers, when the embodiments are implemented collaboratively with such as Google (providing search engine, and Google account linked to Google app store and Google cloud drive), Microsoft (providing Microsoft account, app store, OpenAI, and web browser linked to OS activation), or Apple (providing iOS and Apple ID linked browser and Apple store) for instance. Other potentially banned are social network media accounts (such as Twitter, Facebook and its associated Messenger, WeChat, Line, ShareChat, Instagram, QZone, Weibo, VK, Tumblr, Baidu Tieba, and LinkedIn), brokerage accounts for trading stocks or equities, bank accounts, credit card accounts, cryptocurrency accounts, online shopping accounts (such as Amazon and eBay), taxing service, government service, social security account service, health care service, and others relied on the need of email or phone number verification.

DI packet formatting 671 will incorporate the DI information exemplarily recited previously to form at least one DI packet referring to a string of bits which may be a small segment of a larger message. The purpose of DI packet formatting 671 may be achieved by employing a new type of browsers or an extension incorporated to an existing browser for generating a DI packet to be sent to an Internet webpage on Internet communication device 620. The DI information may be carried in the payload field of a DI packet, in which its length field of IPV6 (and IPV4) has a size of 16 bits, enough for specifying a maximum length of 65535 octets to contain the DI information without involving in jumbo payload option. Optionally, DI packet formatting 671 may utilize part of the source address header (of communication device 630) or header extensions to include the indexing ID that is assigned to represent the device title of a DI information set of personal DI communication device 630.

When Internet communication device 620 receives an incoming signal for online access request issued from personal DI communication device 630, DI verification 622 will verify if the incoming signal contains at least one DI packet. If not, no online access will be granted. DI operating system 600 will instruct personal DI communication device 630 to reperform the building of DI formation 670, the effectuating of DI packet formatting 671 and the transmitting of a new DI packet 605.

DI database 623 is adapted to comprise at least one list for a specific purpose or for various levels of authority in accessing or controlling data. Hereinafter exemplarily recited are a banned DI list and a DI-Member-Only list.

The banned DI list is built to comprise the communication devices involved in a cyberattack to be banned from giving any online access on Internet communication device 620. If the incoming signal contains an indexing ID, DI verification 622 will compare the indexing ID with the banned DI list to see if there is a quick match. Carrying the indexing ID in the source address header or header extensions will further help Internet communication device 620 to decline an Internet data access request even without proceeding with the transmission of the Internet data access request. Thus, preferably organized in the banned DI list are the indexing IDs each comprising its respective DI information set retrieved from the DI packet received from DI packet formatting 671. Even if no match, the detailed DI information set underneath the indexing ID will be further validated. In essence, Internet data 625 will be accessible to personal DI communication device 630 only when its DI packet sent out is determined to meet the requirement of DI verification 622.

The process of DI database 623 may include building, updating, and syncing. When DI operating system 600 detects a cyberattack activity from a communication device, the banned DI list will be updated to include the DI information set identified. The updated DI database will be further synced with a central DI database resided on a central server and the other DI databases on other Internet communication devices participated in the cybersecurity protection.

If Internet communication device 620 requires to possess the highest level of cybersecurity protection, the DI-Member-Only list will be deployed. As recited previously, Internet communication device 620 will serve as the central server for providing the DI-Member-Only network that will preclude unauthorized access from any unknown communication device. The DI-Member-Only network will enable a DI-Member-Only communication device to be able to perform online access to the central server through a URL, FTP, Telnet, Secure Shell, or other communication protocols from various geological locations or different ISPs. Once connected to the central server, it can further establish connection with other DI-Member-Only communication devices. Implemented with DI operating system 600, the central server will offer the cybersecurity protection of the present invention to the DI-Member-Only communication device when surfing the Internet.

The DI-Member-Only network may be further integrated with the banned DI list, so as not to give any opportunity to a cybercriminal's communication device for requesting a connection from the very beginning.

With respect to the building of the DI database, the present invention will further employ a web crawler to crawl across the webpages carrying potential cyberattacks from malicious programs such as adware, viruses, worms, ransomware, bots, Trojan horses, keyloggers, rootkits, spyware, and cryptomining malware. Google, Bing, Yahoo, or other search engines will be utilized to search suspicious file extensions or specific words for analysis. In most cases, these search engines have already indexed all URLs and webpages, which will facilitate the web crawling of the present invention for building the database. The web crawling will visit these URLs indexed by the search engines, by communicating with web servers that respond to those URLs, which will identify all the hyperlinks in the retrieved webpages and will download the files to a sandbox or an isolated computer system of the present invention for analysis. From the analysis, any URL (including domain name) or hyperlink containing the fake or malicious programs deployed by a cyberattacker will be added to the DI banned list.

Torrents are used as a method of distributing files over the Internet, which operate over the BitTorrent protocol to facilitate the so-called peer-to-peer (P2P) file sharing. One of the schemes easily and effectively deployed by cybercriminals is to take the advantage of the P2P file sharing, by repackaging or renaming various malicious adware, viruses, worms, ransomware, bots, Trojan horses, keyloggers, rootkits, spyware, cryptomining malware and others into various files with sizes and names similar to appeared-to-be legitimate software programs. Once torrents have been created, the cybercriminals will upload and post the torrent files, hash data, or magnet links to BitTorrent network, torrent webpages, emails, or text messages as seeds waiting for the baits to be taken. Especially, a cybercriminal may repackage a ransomware program with a special encrypted key to lock all of the data files on a victim's communication devices including servers, computers and intraconnected network.

DI operating system 600 may further build a warned DI list comprising the domain names, the webpages or the URLs that host torrents with archived and/or compressed files that are installable, but are not yet fully analyzed to determine if they will incur a cyberattack. In brief, the DI database may be adapted to comprise the DI-Member-Only list, the banned DI list, the warned DI list, and others for various purposes or various levels of authority in accessing or controlling.

While the recitations hereinabove are focused on establishing DI communication utilizing the architecture of the Internet browsing, it is evidently that the term "DI packet" defined in the present invention will not be limited to the conventional term "packet" in format. Instead, the DI packet of the present invention may be simply a string of bits comprising the specified DI information of a communication device to be controlled, which may not be in Internet browsing form such as IPv4 or the IPV6.

In essence, the DI packet is equivalent to the digital key/fingerprint representing the DI information selected from the group consisting of the IDs derived from the system DI, the hardware DI, the software DI, any of their conversions, and any of combinations of their individual component IDs. The conversions or transformations may be derived from encoding, enciphering, hashing, and any of their combinations. Hash values or cryptographic hash values as digital keys/fingerprints used in the present embodiment may not require deciphering, so long as the representations (including conversions/transformations) of the DI information are stored for comparison.

The present invention may employ hashing algorithms such as MD5 (Message Digest 5) or SHA (Secure Hash Algorithm) to provide privacy if necessary to user accounts, passwords and/or OS licensing ID. Hashes are the output of hashing algorithms, which once created will be stored as permanent hashed DI information on personal DI communication device 630 for use in DI formation 670 and DI packet formation 671. When detecting a cyberattack activity, Internet communication device 620 will store the hashed DI information of a cybercriminal's communication device identified to the banned list on DI database 623 for imposing the punitive damages recited previously.

Consequently, the present invention is applicable to provide the DI-based cybersecurity protection to other communication platforms such as FTP (file transfer protocol), Telnet, Secure Shell, or other communication protocols that are conventionally relying on utilizing the user accounts-and-passwords platform for a login to access a host or a remote terminal. With the recent advent of AI and quantum computing, the user accounts-and-passwords platform will become even much vulnerable to the cybercriminals.

DI Chip for Enabling Trusted Inbound and Outbound Communications

The present invention may further be implemented by a DI chip (module or firmware) enabling trusted DI communication and cybersecurity protection for both inbound and outbound communications. DI module 733 shown in FIG. 7 and DI chip 800 in FIG. 8 each is approximately a miniature of cybersecurity protection means 190 recited previously.

Figure 7:
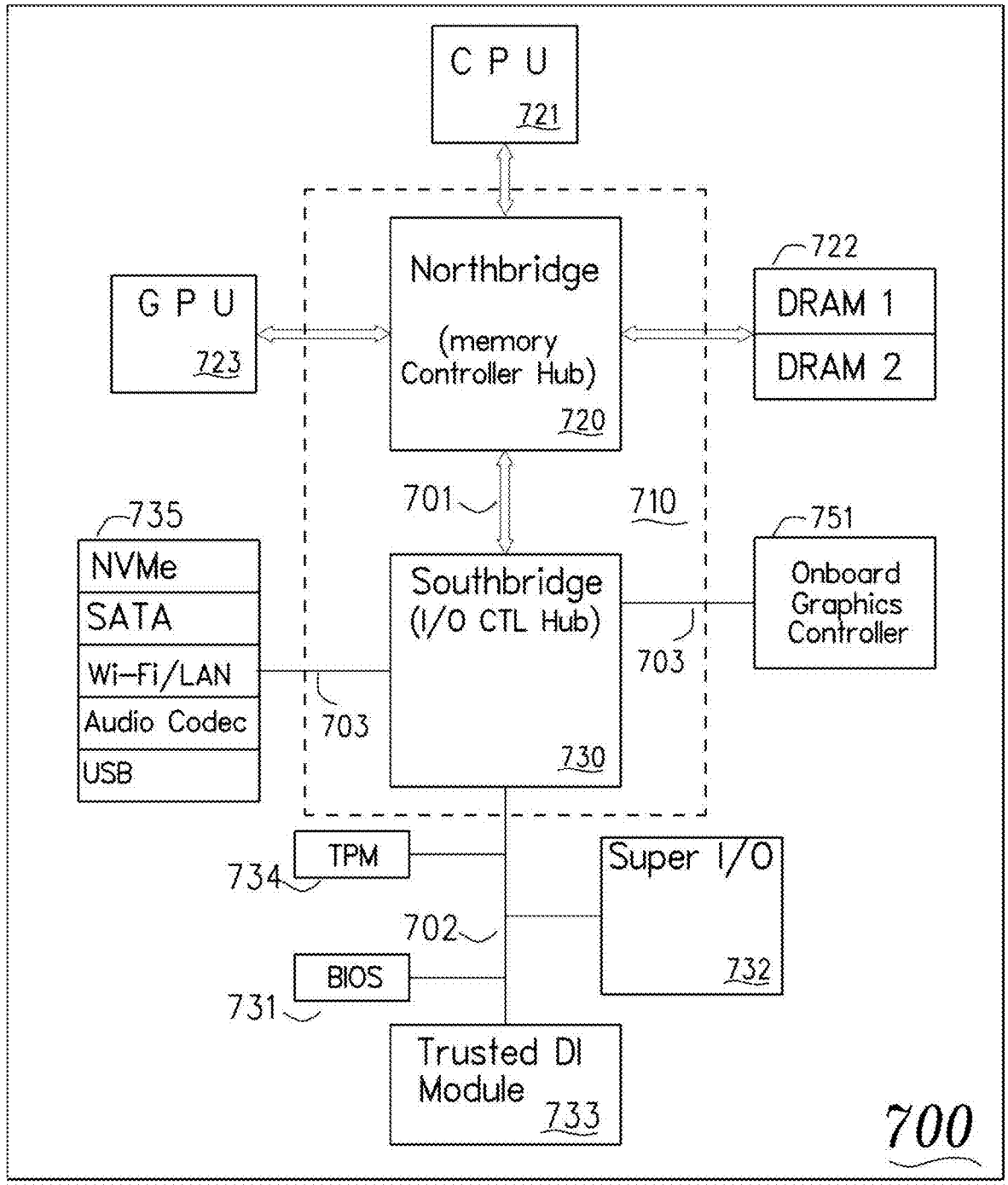
FIG. 7 is a block diagram showing a DI module embedded on a motherboard in accordance with a seventh primary preferred embodiment.

Depicted in FIG. 7 is a block diagram showing the location of DI module 733 on motherboard 700 having a core logic chipset architecture of chipset 710 that basically consists of northbridge 720 and southbridge 730. Northbridge 720 (memory controller hub) is connected directly to CPU 721, DRAM or volatile memory 722 and GPU 723 via the front-side bus (FSB) 701 to handle high-performance tasks. Southbridge 730 (I/O controller hub) handles I/O functions providing (i) LPC (Low Pin Count) bus 702 for system BIOS 731, super I/O 732, DI module 733, and TPM 734, and (ii) PCI/PCIe bus 703 for connecting NVMe/SATA/Wi-Fi/LAN/Audio Codec/USB 735.

DI module 733 is preferably embedded or soldered onto motherboard 700. In addition to FIG. 7 showing the hardware components or parts are assembled removably hereinabove, motherboard 700 may be in form of a single integrated circuit board that is the so-called system-on-chip SoC as used in a smartphone.

When motherboard 700 boots, CPU 721 pins are reset and registers are set to jump to BIOS 731 address so as to run POST (Power On Self Test), to initialize BIOS 731, chipset 710, system buses 701-703, and other hardware devices such as DRAM 722, GPU 723, super I/O 732, DI module 733, TPM 734, and NVMe/SATA/Wi-Fi/LAN/Audio Codec/USB 735. During the initialization, BIOS 731 will interface, collect and provide the initialized hardware DI information to DI module 733 for storage and for use in conjunction with the proceeding of the cybersecurity protection of the present invention.

Hardware DI information is preferably retrieved by interfacing a device having a motherboard for at least one selected from the group consisting of computer system product ID, universally unique identifier, product ID, Internet IP address, MAC addresses of wired and/or wireless communication circuitry integrated on the motherboard, Mobile Equipment ID, phone number ID, Basic Input/Output System firmware ID, motherboard ID, microprocessor ID, graphics processing unit ID, RAM module ID, memory storage ID, TPM module ID including generated ID, DI chip, monitor ID, and any of their combinations.

The importance of FIG. 7 lies in the fact that function of DI module 733 will start to operate once Basic Input/Output System is initiated, so as to provide the cybersecurity protection potentially at the same level of TPM 734 before OS is loaded. DI module 733 comprises control firmware with instructions and memory circuitry. The instructions are provided for (i) setting the content of the mentioned IDs to be focused and selected and/or comprised for forming DI information; and (ii) formatting the DI information in a form suitable for transmitting in order to enable trusted DI communication to both motherboard 700 for inbound connection and remote communication devices for outbound connections. The memory circuitry comprising persistent/nonvolatile memory module for storing the DI information to be used as the device fingerprint of the hardware components and motherboard 700.

Figure 8:
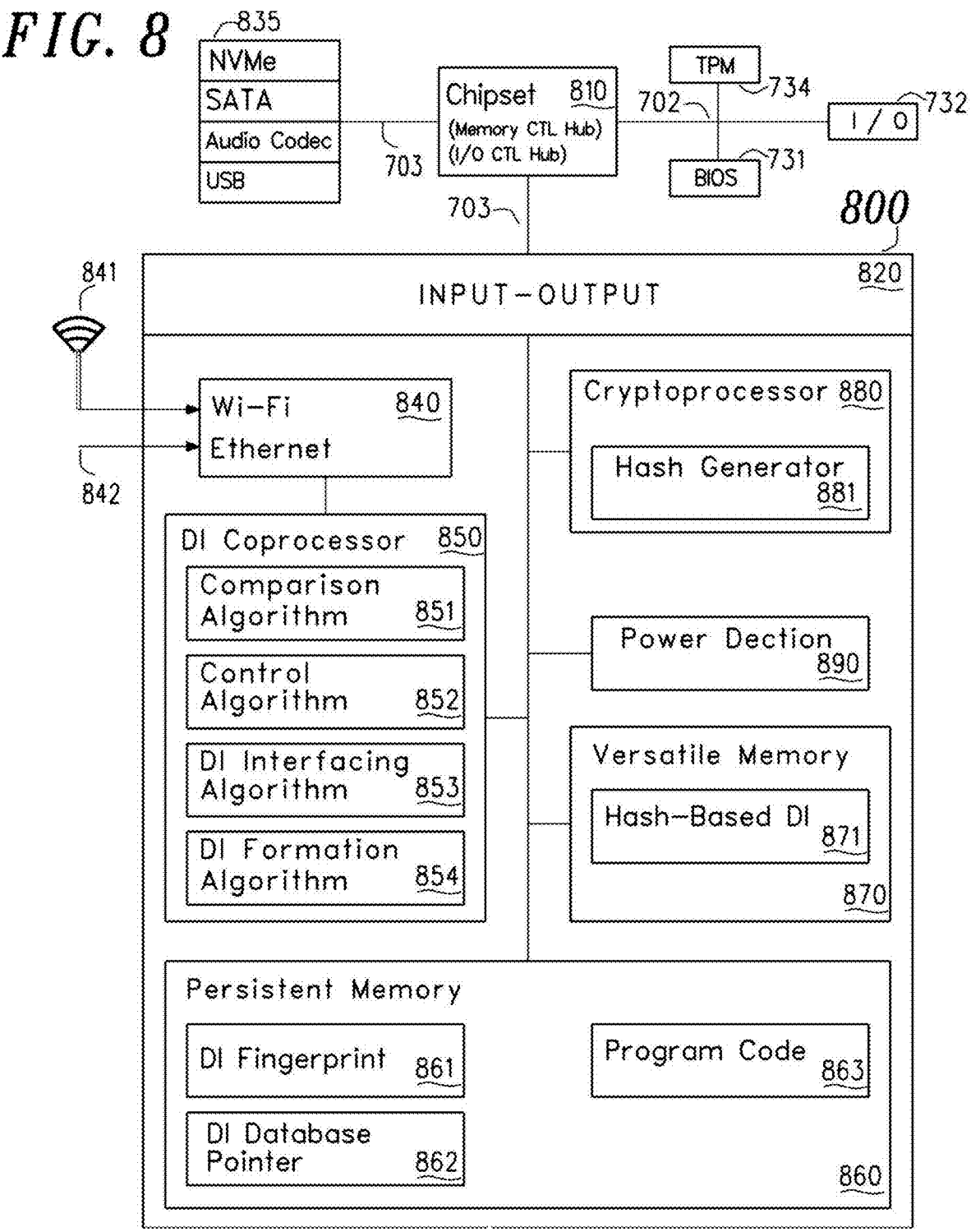
FIG. 8 is a block diagram of a DI chip integrated with communication circuitry to preclude any inbound cyberattack signal and to provide trusted outbound communications, in accordance with an eighth primary preferred embodiment.

FIG. 8 further depicts DI chip 800 in circuit connection with integrated chipset 810 having memory and I/O controller hubs, via PCI/PCIe bus 703 connecting NVMe/SATA/Audio Codec/USB 835, in which NVMe/SATA/Audio Codec may be replaced by memory circuitry (SoC on an integrated motherboard utilized in a smartphone) or flash card and Audio Codec firmware. Similar to FIG. 7, LPC bus 702 is provided for connecting system BIOS 731, super I/O 732 and TPM 734.

DI chip 800 has input-output bus 820 in circuit connection with PCI/PCIe bus 703. Different from DI module 733 in FIG. 7, DI chip 800 is integrated with communication circuitry 840 comprising wireless communication circuitry shown as Wi-Fi 841 and wired communication circuitry as Ethernet 842 for receiving incoming signals externally. Further comprised in DI chip 800 are DI coprocessor 850, persistent memory 860, versatile memory 870, cryptoprocessor (cryptographic coprocessor) 880, and power detection 890. Persistent memory 860 is nonvolatile and provided for storing DI fingerprint (or biometrics) 861 and DI database pointer 862, while versatile memory 870 offers memory needed during the initialization and operation of DI chip 800.

When a communication device implemented with the present embodiment is booted, DI chip 800 will be ensured to function properly with power detection 890 along with BIOS 731 initialization. DI coprocessor 850 comprises instructions executable by comparison algorithm 851, control algorithm 852, DI interfacing algorithm or means 853, and DI formation algorithm 854. DI interfacing algorithm 853 is provided to interface with BIOS 731 (also EFI or UEFI) for obtaining system DI 635, hardware DI 650 and embedded software DI 660 recited in FIG. 6, when initialized. After device OS is loaded, DI interfacing means algorithm 853 will further obtain software DI 660 from installation such as per-machine-based software program serial keys, especially OS licensing information. The obtained DI information will be stored in persistent memory 860 as DI fingerprint (or biometrics) 861.

DI formation algorithm 854 will proceed with DI formation 670 and DI packet formatting 671 recited in FIG. 6. DI information obtained from system DI 635, hardware DI 650 and software DI 660 may be wholly retained for storage in persistent memory 860 and/or formatted into specified or core DI information by DI formation 670 in accordance with the six primary preferred embodiment previously recited. DI packet formatting 671 may form the DI information into a string of bits in the Internet protocol format for accessing the Internet, or communication protocols such as FTP, Telnet, Secure Shell, or hashed DI information in conjunction with cryptoprocessor 880, or others. DI formation 670 may further select and format DI information into a specific size for instance 256-1024 bits, or to the upper limit to fit within the 2048 bits if a SRK (RSA) is employed, or a larger size to be defined in future.

DI formation algorithm 854 may be further adapted for setting a portion of each of the IDs to be focused and selected (from the system DI, the hardware DI and/or the software DI) for formatting into a string of bits in a predefined size suitable for transmitting to a remote communication device so as to enable outbound connections with the DI communication.

The bit is always the most basic unit of information in computing and digital communications. In applications, binary bits may be grouped into bytes (octets or octal digits) or hexadecimal digits when the bits are received for conversion.

Control algorithm 852 may be further adapted for building a DI database for the DI chip to be able to control if an online access request from a remote communication device should be granted or not, and wherein the DI database comprises the DI information of the remote communication devices to be controlled, and the DI information is selected from the group consisting of the IDs recited previously and any of combinations of their individual component IDs. DI coprocessor 850 may be further adapted for building the database to comprise a banned DI list for the remote communication devices to be imposed with punitive damages, wherein the banned DI list comprises DI information selected from the group consisting of the IDs and any of their combinations to be banned, and the punitive damages are adapted to render the IDs comprised in the banned DI list incapable of obtaining Internet and/or online access. The control means may be further adapted for syncing the banned list with a central banned list resided on a remote central system, if the banned list is modified and/or needed updating from the central banned list.

DI fingerprint (or biometrics) 861 may comprise all of the available DI information obtained from DI interfacing algorithm 853, specific/selected/core DI information derived from DI formation algorithm 854, and hashed DI information encoded by hash generator contained in cryptoprocessor 880.

Further stored in persistent memory 860 is DI database pointer 862 for pointing to the physical location on memory storage such as NVMe/SATA represented by NVMe/SATA/Audio Codec/USB 835. The DI database associated with DI database pointer 862 comprises the DI information of the remote communication devices to be controlled as recited previously, which may include DI-Member-Only list, allowed DI list, banned DI list, and/or warned DI list as recited previously.

In the conventional practice, TPM 732 comprises a secure cryptoprocessor that is necessary (i) for generating and storing secured information such as user credentials, keys, passwords, fingerprints or certificates, and (ii) for performing cryptographic operations such as asymmetric encryption, decryption and cryptographic hashing. The secure cryptoprocessor is further required to comprise a random number generator, a key generator and a hash generator for generating public and private keys.

In contrast, a combination of the IDs selected from system DI 635, hardware DI 650, and software DI 660 as recited in the present invention will form a string of bits essentially unique enough without requiring any random number generator, key generator or hash generator relied on by TPM. Even if hashed for satisfying a privacy concern, the hashed or enciphered DI information of the present invention is still unique enough to possess the functionality of TPM 734 and will provide a root of trust for remotely attesting a computer's specified hardware DI and software DI of the present invention. Especially, the hardware DI of the present invention may be designated to include the detailed level of individual hardware components, which is a fact not achievable by TPM. Further, DI chip 800 will provide DI fingerprint (or biometrics) 861 stored in persistent memory 860 for enabling trusted DI communication with cybersecurity protection without requiring decryption, as exemplarily recited in the DI-Member-Only network detailed in FIG. 4 and in the fourth primary preferred embodiment. Most important is DI chip 800 is for a totally different purpose that is to provide cybersecurity protection and to impose punitive damages to cybercriminals and cyberterrorisms' communication devices, on top of enabling the trusted inbound and outbound communications.

Another prominent embodiment of FIG. 8 is stemmed from the integration of communication circuitry 840 comprising wireless communication circuitry shown as Wi-Fi 841 and wired communication circuitry as Ethernet 842 for receiving incoming signals externally. DI coprocessor 850 will derive the DI information when receiving an incoming signal issued from a remote Internet communication device. Comparison algorithm 851 will be proceeded for validating the derived DI information from communication circuitry 840, in conjunction with DI database pointer 861 pointing to the database stored in NVMe/SATA that may comprise an allowed list, a banned list and/or a warned DI list. DI coprocessor 850 will allow or disallow if a communication request should be established for the incoming signal from the remote Internet communication device. Thus, cybersecurity protection is achieved for the inbound communication as recited in previous embodiments, in which DI chip 800 is functioning as a miniature of isolated cybersecurity protection means 190 to protect a personal communication device. If matched with the banned list, any link such as Internet IP address, domain name, URL address from the incoming signal (from a cybercriminal's Internet server) will be automatically banned for browsing. Thus, any virus will be precluded from getting further into NVMe/SATA. Cyberattacks will be extinguished from the very beginning, ensuring the cybersecurity protection to the personal communication device. On the hand, DI fingerprint (or biometrics) 861 stored in persistent memory 860 will be instantly available for transmitting as a device certificate to a remote Internet communication device for giving trusted outbound communication.

In essence, DI chip 800 will preclude any inbound cyber-attack from getting into device memory storage NVMe/SATA and will provide a DI fingerprint as a trusted certificate for outbound communication. While the reciting hereinabove is exemplarily given to a personal communication device, DI chip 800 functioning similarly to cyber-security protection means 190 is also applicable for implementation to an Internet sever for achieving cybersecurity protection with punitive damages as recited previously. For instance, when the DI database stored on memory storage NVMe/SATA comprises DI-Member-Only list, DI chip 800 will enable the DI-Member-Only network previously recited. And, a banned list will ban a cybercriminal communication device from getting any Internet access.

In summary, the seven primary preferred embodiment provides a DI chip for enabling trusted inbound and outbound communications, comprising: (a) input/output means for establishing circuit connection with hardware components; (b) DI interfacing means in circuit connection with the input/output means, for obtaining DI information selected from the group consisting of computer system product ID, universally unique identifier, Internet IP address, domain name address, URL address, MAC addresses of wired and/or wireless communication circuitry, Mobile Equipment ID, phone number ID, Basic Input/Output System firmware ID, motherboard ID, microprocessor ID, graphics processing unit ID, RAM module ID, memory storage ID, TPM module ID including generated ID, DI chip (FIG. 8), monitor ID, device OS license ID, activation ID, installation ID, digital license ID, Client Machine ID, machine ID, VPN ID, user account ID linked to software developer server for account verification, virtual phone number ID, social network media account ID, digital key ID, biometric data ID, and any of their combinations; and wherein the ID refers to identification, identifier, identity, serial number and/or address selected from the group consisting of numbers, letters, character, typographical symbol, and any of their combinations; (c) control means comprising a coprocessor and instructions or algorithms for (i) setting the content of the IDs to be focused and selected and/or comprised for forming the DI information; and (ii) formatting the DI information in a form suitable for transmitting so as to provide the trusted DI communications to a remote communication device.

The DI chip further comprises persistent memory circuitry for storing the DI information as the device fingerprint for enabling the trusted inbound and outbound communications. The DI chip may further comprise a cryptoprocessor for encoding, enciphering, and/or hashing the DI information as the device fingerprint for enabling outbound connections with DI communication. The DI chip further comprises communication circuitry for receiving and for controlling the traffic flow of an incoming signal from a remote communication device, so as to preclude any inbound cyberattack from getting into device memory storage DI interfacing means may be embedded firmware, instructions, algorithm, or coprocessor for retrieving DI information from Basic Input/Output System firmware.

The control means may be further adapted for setting a portion of each of the IDs to be focused and selected for formatting into a string of bits in a predefined size suitable for transmitting to the remote communication device so as to enable outbound connections with the DI communication. The control means may be further adapted for building a DI database for the DI chip to be able to control if an online access request from a remote communication device should be granted or not, wherein the DI database comprises the DI information of the remote communication devices to be controlled. The DI information may be selected from the group consisting of the IDs recited hereinabove and any of their combinations. The control means may be further adapted for building the database to comprise a banned DI list for the remote communication devices to be imposed with punitive damages, (i) wherein the banned DI list comprises the communication devices to be banned, and (ii) wherein the punitive damages are adapted to render the IDs comprised in the banned DI list incapable of obtaining Internet and/or online access, and the device OS invalid. The control means may be further adapted for syncing the banned list with other Internet systems participated in the cybersecurity protection, so that any communication device once identified to get involved in the unwanted activity on one Internet communication device will be sweepingly banned by all of the other Internet communication devices as a punitive measure.

In essence, the present invention will provide the DI-based cybersecurity protection instantly available for use that is also applicable to enhance the conventional communication platforms such as web or Hypertext Transfer Protocol (http, and https), e-mail (SMTP, POP, IMAP), FTP (file transfer protocol), Telnet, Secure Shell, or other communication protocols that are conventionally relying on utilizing the user accounts-and-passwords platform for a login to access a host or a remote terminal.

There are also improved secured communications conventionally based on cryptographic keys, TPM and two-step verification methods. However, the recent advent of AI and quantum computing will render the user accounts-and-passwords platform, the cryptokey and the TPM methods vulnerable to the cybercriminals. Similarly, cryptocurrency will be also vulnerable when facing the power of quantum computing, unless implemented with the DI communication of the present invention.

Also, cyberattackers may assemble enough information to recover secret keys that underpin the security and confidentiality of a cryptographic algorithm, by carefully monitoring characteristics such as power consumption, sound, electromagnetic emissions, or the amount of time it takes for an operation of cryptographic keys to occur. On the other hand, the two-step verification is not practical when waiting time is not permitted in military applications or in an emergency situation, when a smartphone is lost, unable or has no signal to be used for verification, or when the linked email account cannot be opened due to various reasons such as being blocked by countries or geological locations. In Asian countries, the scamming/phishing phone calls and or messages are particularly becoming profusely rampant and inflicting many helpless victims because cybercriminals can practice cybercrimes at no cost for enormous illegal profits. Especially, the scammers/phishers now are able to deploy AI to make voice and video replicas of a friend or relative of a victim for conducting a video phone scamming or phishing.

To overcome the major disadvantages of the cybersecurity protection offered by conventional wisdom, the present invention provides the DI communication for proactively imposing punitive damages to cybercriminals and cyberterrorisms by rendering their communication devices and the reusability of their hardware components once identified to get involved in malicious activities incapable of gaining future access to the Internet and or network. The OS of the communication devices deployed by the cybercriminals and cyberterrorisms can be rendered invalid, when the present invention is implemented by OS developers such as Microsoft, Apple, Google, Harmony and others. Thus, for the first time, no cybercriminal can practice any malicious cybercrime without being exposed to a risk of the punitive damages. Equally important are the facts that the characteristics of the DI chip, communication device, smartphone, system, and operating system of the present invention will not be hackable by AI or quantum computing, and will enable DI communication with cybersecurity protection instantly available without waiting for a two-step confirmation. Especially, the embodiment of the DI-Member-Only network is particularly suitable for the applications in need of controlling the classified information with absolute cybersecurity protection.

In accordance with FIG. 7, the seventh primary preferred embodiment is to provide a trusted DI module (or chip) for enabling trusted inbound and outbound communications, comprising: (a) input/output means for establishing circuit connection with hardware components such as motherboard, microprocessor, graphics processing unit, and memory storage; (b) DI interfacing means in circuit connection with the input/output means, for obtaining ID information of the hardware components and the software selected from the group consisting of computer system product ID, universally unique identifier, Internet IP address, domain name address, URL address, MAC addresses of wired and/or wireless communication circuitry, Mobile Equipment ID, phone number ID, hardware VPN ID, Basic Input/Output System firmware ID, motherboard ID, microprocessor ID, graphics processing unit ID, RAM module ID, memory storage ID, TPM module ID including generated ID, DI chip (FIG. 8) monitor ID, device OS license ID, activation ID, installation ID, digital license ID, machine ID (including Client Machine ID), software VPN ID, user account ID linked to software developer server for account verification, virtual phone number ID, social network media account ID, digital key ID, biometric data ID, and any of their combinations; and wherein the ID refers to identification, identifier, identity, serial number and/or address selected from the group consisting of numbers, letters, character, typographical symbol, and any of their combinations; and (c) control means comprising a coprocessor and instructions for (i) setting the content of the IDs to be focused and selected and/or comprised for forming the DI information; and (ii) formatting the DI information in a form suitable for transmitting so as to provide the trusted DI communications to a remote communication device; (d) persistent memory circuitry for storing the DI information as the device fingerprint for enabling the trusted inbound and outbound communications; (e) a cryptoprocessor for encoding, enciphering, and/or hashing the DI information; and/or (f) communication circuitry for receiving and for controlling incoming signals from a remote communication device, so as to preclude any inbound cyberattack from getting into device memory storage.

Preferably, MAC addresses refer to the wired and/or wireless communication circuitry embedded or integrated to the motherboard of a device, instead of a plug-in communication card.

In accordance with FIG. 8, the eighth primary preferred embodiment is to provide a DI chip for enabling trusted inbound and outbound communications, comprising: (a) input/output means for establishing circuit connection with hardware components such as motherboard, microprocessor, graphics processing unit, and memory storage; (b) buses in circuit connection with the input/output means, for proceeding with internal interfacing with the hardware and its OS/software; and (c) control means comprising a coprocessor and instructions for (i) setting the content of the IDs to be focused and selected and/or comprised for forming the DI information; and (ii) formatting the DI information in a form suitable for transmitting so as to provide the trusted DI communications to a remote communication device; (d) persistent memory circuitry for storing the DI information as the device fingerprint for enabling the trusted inbound and outbound communications, without performing the internal interfacing; (e) a cryptoprocessor for encoding, enciphering, and/or hashing the DI information; and/or (f) communication circuitry for receiving and for controlling incoming signals from a remote communication device, so as to preclude any inbound cyberattack from getting into device memory storage.

DI Communication Achieves Direct Verification by Omission of Several Elements Relied Upon by Prior Art Recited in FIGS. 1-8 are the novel features of providing DI information for use in establishing direct DI communication, referring to DI intercommunication between a device (smartphone or computer) and an external control system (control center, server or Internet system). The novelty of primary preferred embodiments recited hereinabove clearly demonstrates the omission of several elements with retention of the element's function on direct device verification, compared with the prior art.

In contrast to the present invention, U.S. Pat. No. 10,674, 009 teaches a verification method for providing verification to a smartphone and a relying party, which requires at least three additional steps as recited by Jakobsson in col. 20 lines 46-51: "In the example shown, relying party 910 passes, at 918, the user's phone number (the phone number indicated via caller id or ANI data that is observed by the relying party) to verification service 912. The verification service sends, at 920, an SMS message or other communication with a unique identifier to smartphone device 904" and col. 20 lines 55-61 "Inbound interceptor 908, which in some embodiments, is an example of a portion of a communication unit such as communication unit 104 of FIG. 1, captures the incoming message (920) and recognizes that the message is from verification service 912. The inbound interceptor extracts the unique identifier from message 920 and passes it (924) to communication unit 906."

The conventional practice such as USPTO's verification also similarly involves (i) USPTO employs a verification provider to send a one-time passcode (OTP) by an SMS to an applicant's smartphone, in response to the applicant's request for login; (ii) the applicant's smartphone receives the OTP; and (iii) the applicant then replies with the manual input of the OTP received on the smartphone to a USPTO website.

Omission of an element with retention of the element's function is an indicium of nonobviousness. Further, each usage of Jakobsson's verification method relying on the three additional steps and the manual input or reply is inconvenient and resource wasteful. There are many instances and circumstances that prohibit any manual input or reply, such as in urgency and in military applications, in which time is very crucially and decisively costly.

Figure 9:
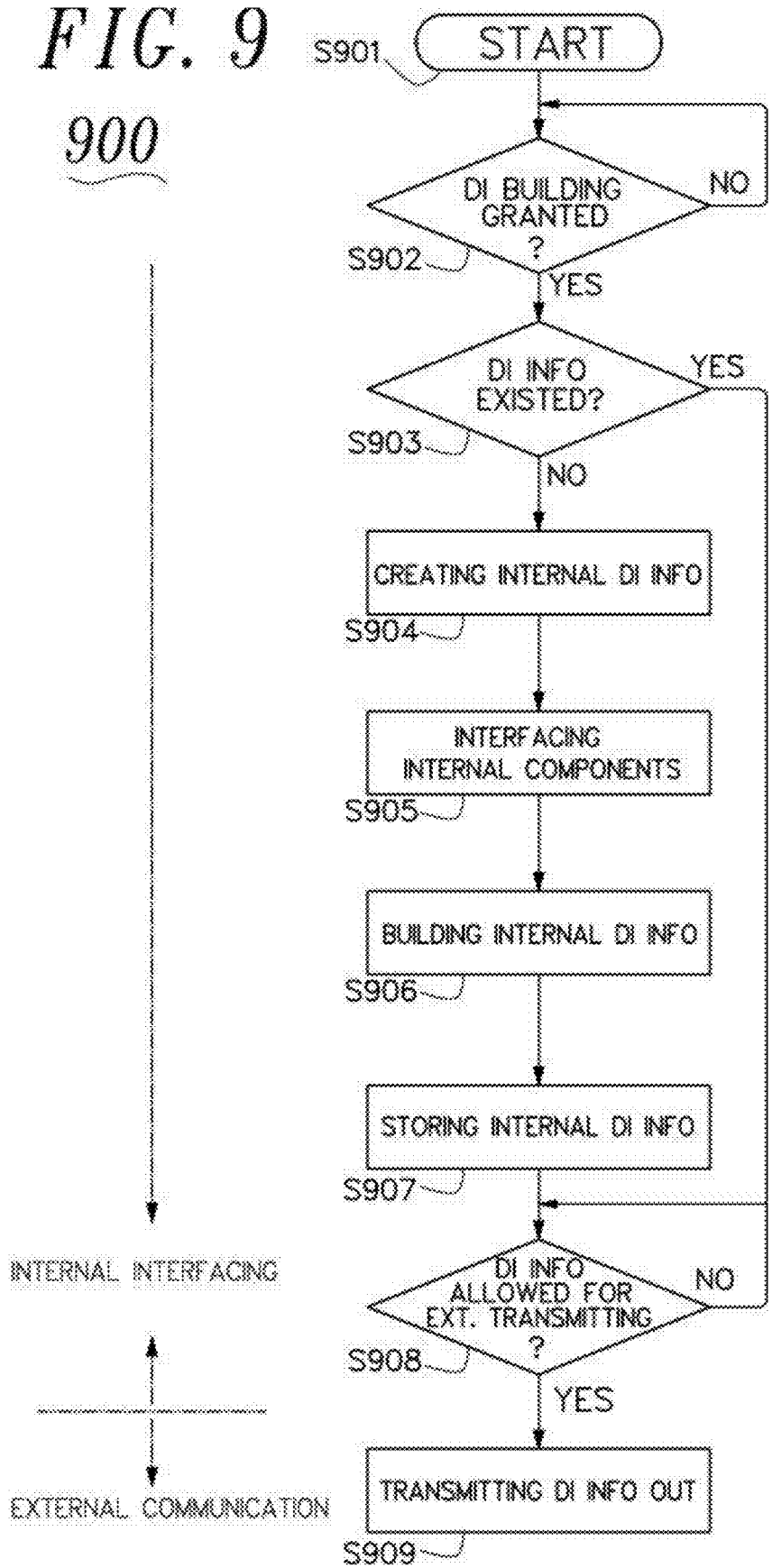
FIG. 9 is a cybersecurity operating method enabling an autonomous device capable of selectively providing DI intercommunication to an external control system, in accordance with a ninth primary preferred embodiment.

DI Operating Method Rendering AuT Capable of Providing Cybersecurity Protection to External Control Systems Depicted in FIG. 9 is a ninth primary preferred embodiment showing DI operating method 900 rendering an autonomous device or thing (AuT) capable of providing cybersecurity protection to an external control system. The autonomous device is implemented exemplarily with personal DI communication device 630 (FIG. 6), trusted DI module 733 (FIG. 7) or DI chip 800 (FIG. 8) capable of internally building DI information for providing DI communication 601 and data transmitting (through Wi-Fi/LAN 735 or Wi-Fi/Ethernet circuitry 840) externally to Internet communication device 620 depicted in FIG. 6 (providing Internet data to be accessed) or external control systems or centers.

The "DI" information of the present invention refers to "device identification" for use as the fingerprint or biometrics of a device.

The autonomous devices may be Autonomous Things (AuT), Internet of Autonomous Things (IoAT), Internet of Medical Things (IoMT), robots, self-driving vehicles or autonomous cars or UAVs 140 or drones or UAS 145 (FIG. 1), relying on Autonomous Technology by the use of artificial intelligence (AI) for each of them to function independently without human involvement when encountering various parameters from their surroundings. To establish DI communication with cybersecurity protection with an external control system or center (by means of the Internet 610, Internet communication devices 620 depicted in FIG. 6, or satellite communication system 110C in FIG. 1), each of autonomous devices is implemented with personal DI communication device 630 (FIG. 6), trusted DI module 733 (FIG. 7) or DI chip 800 (FIG. 8) comprising an operating system 900 having instructions depicted exemplarily in the flowchart of FIG. 9.

When receiving a request S901 either from an owner or from an external control system, the autonomous device checks if owner permission is granted at S902. If granted, optionally followed is S903 determining if DI information is available or existed in memory or storage situated in the autonomous device. If not, S904 obtaining device IDs will be followed with S905 interfacing internal hardware components of the autonomous device by means of its internal buses such as the front-side bus (FSB) 701, LPC (Low Pin Count) bus 702 for interfacing system BIOS 731, super I/O 732, DI module 733, and TPM 734, PCI/PCIe bus 703 for connecting NVMe/SATA/Wi-Fi/LAN/Audio Codec/USB 735 exemplarily depicted in FIG. 7 and FIG. 8.

In the present invention, the exemplary description of interfacing hereinabove is defined as "hardware interfacing."

Interfacing of the present invention requires buses in circuit connection or communication with the unit/system UUID and IDs embedded on the autonomous device including hardware components, firmware, and/or OS installed on storage (such as NVMe or SATA 735/835 in FIG. 7 and FIG. 8) of an autonomous device. In contrast, communication mostly refers to external communication or intercommunication involving in transmitting data externally out and/or in with respect to an external control system (or Internet communication device 620 depicted in FIG. 6 for instance), which relies on wireless or cable through a Wi-Fi/LAN 735, or Wi-Fi/Ethernet circuitry 840, NearLink, Bluetooth, NFC and UWB, wireless data transmitting through cell tower 160A or 160B, satellite communication system including earth stations 171A, 171B, or satellite/GPS 171C depicted in FIG. 1, instead of internal buses.

Followed S905 interfacing internal components is S906 setting internal DI information. The DI information refers to at least one of the IDs obtained from the hardware components and/or per-machine-based software internally contained in the autonomous device. The setting may further include formatting the specified DI information into at least one DI packet, referring to a string of bits. Building/setting a maximum of DI formation at the step of S906 will impose the most severe punitive damages to a cybercriminal by rendering his/her communication device including all of its hardware components and device software programs inoperable totally if it is detected to get involved in cyberattacking.

Setting lesser DI information at the step of S906 may be sufficient for rendering the autonomous devices (implemented with Autonomous Technology served as AuT, IoAT, IoMT, robots, self-driving vehicles or autonomous cars or UAVs 140 or drones or UAS 145 in FIG. 1) applicable of providing needed DI communication with cybersecurity protection to the external control system, so that each of them can self-run independently under various or time-changing parameters from their surroundings.

Optionally provided is S907 storing internal DI information to memory or storage such as NVMe or SATA 735/835 or persistent memory 860 depicted in FIG. 7 and FIG. 8. At the step of S908, the owner may grant or deny the external transmitting of the DI information out to the external control system. If granted by the owner, the DI information will be transmitted out at S909 establishing external communication by means of wireless or cable through Wi-Fi/LAN 735, or Wi-Fi/Ethernet circuitry 840, NearLink, Bluetooth, NFC and UWB, wireless data transmitting through cell tower 160A or 160B, satellite communication system including earth stations 171A, 171B, or satellite/GPS 171C depicted in FIG. 1.

S909 is actuated only if owner permission is granted at S908, so that the transmission of the DI information will be taken place only to the external control system trusted or permitted to be accessed for cybersecurity protection.

As depicted in FIG. 9, the steps of S901 through S908 are involved only in interfacing of the internal components of the autonomous device, while S909 is proceeded only with external communication or intercommunication for transmitting DI information to an external control system. DI operating method 900 or the instructions may be installed as an app, or software program, or embedded to a single component selected from the group consisting of at least one chip, firmware, algorithm, coprocessor, circuit, and any of their combination depicted exemplarily as DI chip 800 shown in FIG. 8.

DI operating method 900 may further comprise additional steps of (i) validating authenticity of feedback data responded from an external control system, and (ii) if validated, relaying the feedback data to artificial intelligence circuitry or algorithm for the autonomous device to proceed with responded autonomous actions in accordance with the feedback data, wherein the authenticity of the feedback data preferably contains the DI information of the autonomous device and/or the external control system. The feedback signals may further comprise non-digital signals either bounced back from or absorbed by any object that contains no communication circuitry. In an absorbed mode, the non-digital signals or wireless waves will be diffused, dispersed, attenuated, or diminished without be bounced back.

In summary, provided in the ninth primary preferred embodiment is a DI operating method for rendering a device or an autonomous device or thing capable of providing cybersecurity protection to an external control system. The DI operating method comprises: (a) monitoring if the device receives owner permission for transmitting its DI (device identification) information to the external control system; (b) if yes, checking if the DI information exists; (c) actuating the device to perform hardware interfacing for device IDs embedded thereon, wherein the device comprises communication circuitry for establishing intercommunication with the external control system or for transmitting the DI information out of the device; (d) setting at least one of the device IDs to be focused as the DI information referring to a unique device fingerprint of the device; (e) storing the DI information if necessary; (f) determining if the device is allowed to transmit the DI information to the external control system. The DI information of the device may be stored or embedded in a chip or in hardware components generally comprising (i) device processing circuitry, (ii) a device motherboard thereon situated with the device processing circuitry, (iii) device memory circuitry, (iv) device communication circuitry, and (v) device buses in circuit connection with the device processing circuitry, the device motherboard, the device memory circuitry, and the device communication circuitry for establishing internal interfacing for the device hardware IDs embedded thereon and for a device OS ID installed on the device memory circuitry. Transmission of the DI information will be taken place only to the external control system trusted or intended to be accessed for cybersecurity protection. The device may be a communication device, computer, control system, server, Internet system, smartphone, smartwatch, Autonomous Thing (AuT), Internet of Autonomous Thing (IoAT), Internet of Medical Thing (IoMT), AI device/machine, robot, android, autonomous car or unmanned aerial vehicle, drone or unmanned aircraft system.

DI Operating Method Rendering Autonomous Devices Cybersecurity Protected

Figure 10:
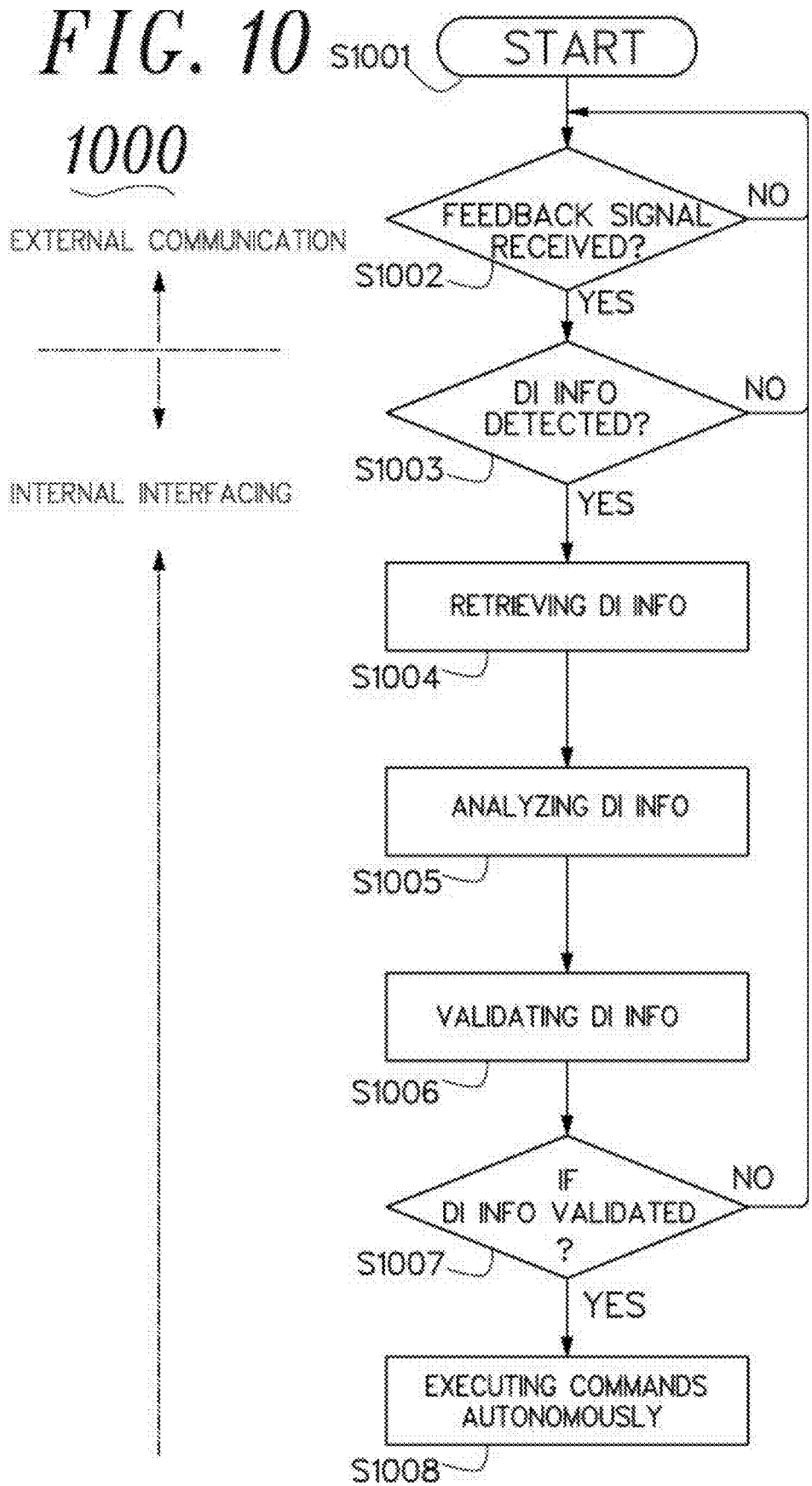
FIG. 10 is a cybersecurity operating method rendering an autonomous device cybersecurity protected, in accordance with a tenth primary preferred embodiment of the present invention.

Depicted in FIG. 10 is a tenth primary preferred embodiment showing DI operating method 1000 that enables an autonomous device capable of providing cybersecurity protection to itself for executing commands autonomously in accordance with feedback data received from an external control system.

The autonomous device may be an autonomous car 140, drone or UAS 145, flight, missile, or Autonomous Thing (AuT). Especially when numerous autonomous devices or machines are present crowdedly, cybersecurity protection will become much more crucial to prevent each of them from being interfered or sabotaged in order to establish intercommunication exclusively with their respective control systems through global positioning signals, laser detecting signals, or other navigation satellite signals.

The DI operating method implemented to an autonomous device starts with S1001 standing by for a feedback signal from an external control system, or returned laser signals from surroundings by LiDAR (Light raDAR), or returned wireless wave bounced back non-digitally by an object of surroundings to be sensed by the sensors situated on the autonomous device. S1002 determines if the feedback signals (or returned signals) further contain digital data of DI information. If yes, followed S1003 is to proceed with S1004 for retrieving responded DI information from the feedback signals. The responded DI information is further analyzed at S1005 and validated at S1006 to determine at S1007 if the responded DI information matches with the internal DI information of the autonomous device previously obtained by internal interfacing from S906 or stored at S907 in FIG. 9, or the allowed DI information previously registered or stored on the autonomous device.

S1005 analyzing DI information is preferably rendered to include the step of verifying each of device IDs comprised in the DI information retrieved from S1004 is in an acceptable format having a fixed length of digits, and the step of defining a respective fixed length of digits to each of the device IDs to be used as the DI information.

As recited hereinabove and depicted in FIG. 6, various command/cmd/PowerShell prompts have been used for retrieving various device IDs that have different fixed length of digits and formats. The step of setting recited in the primary preferred embodiments is thus followed with the defining. Exemplarily, UUID retrieved from "wmic csproduct get uuid" has 32 hex digits along with 4 "-" symbols, which makes its length of 36 digits or characters in the 8-4-4-4-12 format. "wmic baseboard get serialnumber" retrieves 14 digits for motherboard ID. "wmic cpu get processorid" gives 16 digits for CPU ID. "wmic os get serialnumber" retrieves 20 hex digits along with 3 "-" symbols, making its length of 23 digits for OS ID in the 5-5-5-5 format. "wmic bios get SerialNumber" gives 13 digits for bios ID. Machine ID retrieved from "reg query HKEY_LOCAL_MACHINE\SOFTWARE\Microsoft\ SQMClient/v MachineId" has a total of 38 digits with 6 digits of "{" "}" and 4 "-" symbols in a format of {8-4-4-4-12}. TPM serial number has 32 digits.

Accordingly, the step of defining is necessary for each of device IDs and the step of verifying is to ensure to obtain the ID requested.

If the responded DI information matches with the internal DI information, the AuT will accept the feedback signals for proceeding further with next (responded) autonomous actions S1008, so as not interfered by other AuT in the vicinity, or not sabotaged by a cybercriminal.

In essence, the tenth primary preferred embodiment is an operating method rendering an autonomous device cybersecurity protected, comprising: (a) enabling the autonomous device, in response to feedback signals, to request the external control device to provide feedback device IDs if detecting the feedback signals contain no device IDs, wherein the external control device comprises at least communication circuitry for establishing intercommunication with the autonomous device; (b) retrieving the external device IDs from the enabling, for use as a unique fingerprint of the external device; (c) building allowed device IDs resided on the autonomous device, representing the remote devices to be allowed for intercommunication; and (d) allowing the external device to establish intercommunication with the autonomous device through the communication circuitry, only if the unique fingerprint is obtained and comprised in the allowed device IDs.

Alternatively, the tenth primary preferred embodiment is an operating method rendering an autonomous device cybersecurity protected, by incorporating its device IDs to outgoing signals, detecting if feedback signals associated with the outgoing signals contain the digital data of the device IDs, and accepting only the feedback signals that contain the device DI information for performing its subsequent autonomous actions.

Software Piracy Protection by Integration of DI information

Figure 11:
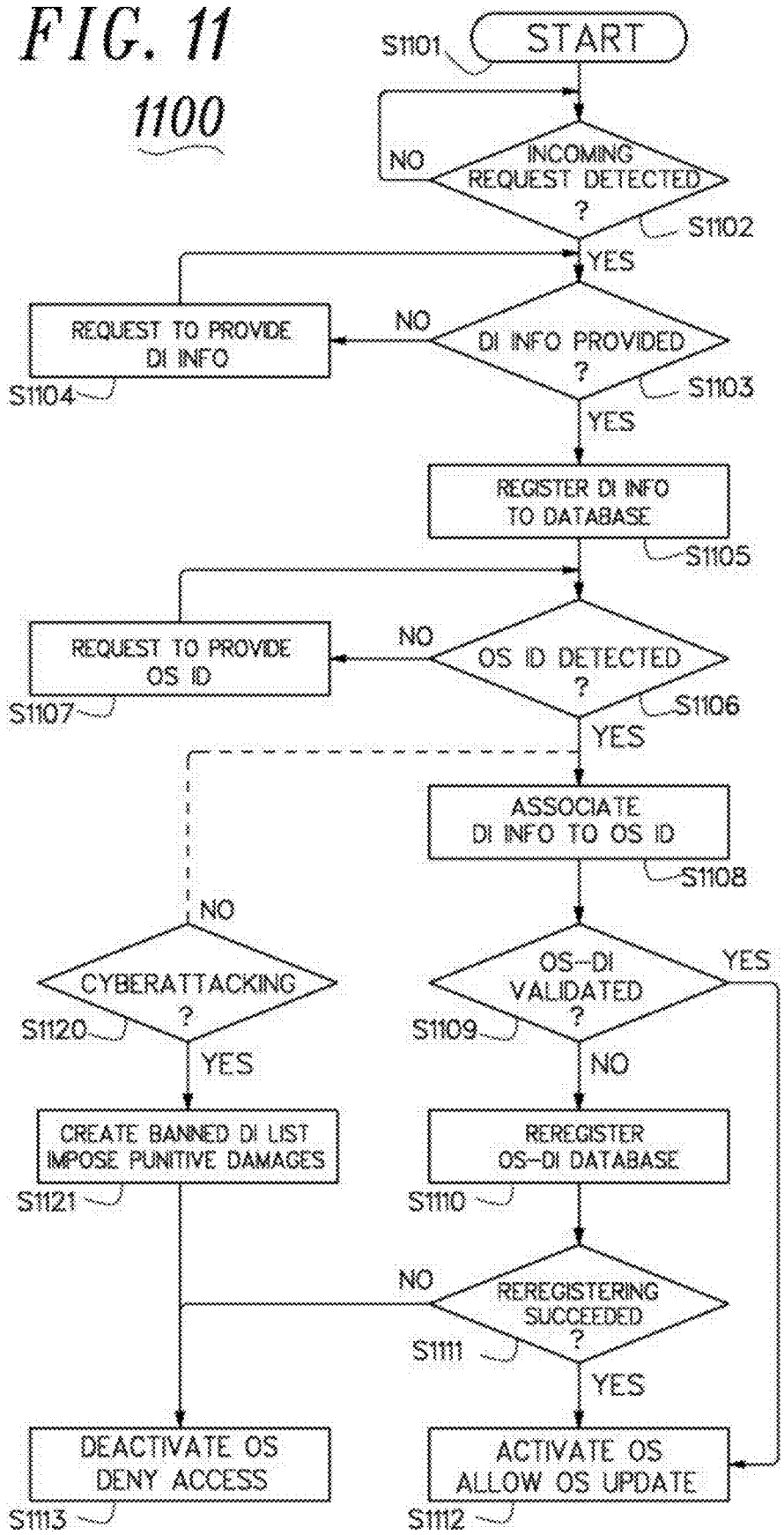
FIG. 11 is a method enabling software piracy protection by associating DI information with OS ID, in accordance with an eleventh primary preferred embodiment of the present invention.

FIG. 11 is an eleventh primary preferred embodiment showing a method of providing software piracy protection by integrating or associating DI information of the present invention with software license IDs. Conventionally, an OS or software program is installed without involvement of the DI information, as the conventional practice allows the entire content (including OS license ID and activation ID) of a memory storage device to be cloned for use in a different computer.

The method 1100 depicted in FIG. 11 enables an OS or software provider's verification server or center system to start at the step of S1101 waiting for detecting an incoming request S1102 from an AuT, computer or communication device. The incoming request may be for OS activation, OS update or upgrade.

S1103 checks if the incoming request provides DI information. If not, S1104 requests the AuT, computer or communication device to be allowed for providing its DI information to the OS verification server. The DI information requested at S1104 will be initiated from the OS verification server by sending a command to the AuT for requesting hardware interfacing and software interfacing. Hardware interfacing on the AuT is to interface its hardware components having circuit connection with buses as exemplarily depicted in FIG. 7 and recited, so as that the device hardware IDs may be selected from the group consisting of system product ID, universally unique identifier, MAC addresses of wired and/or wireless communication circuitry embedded on or integrated to the motherboard, Input/Output System firmware ID, motherboard ID, microprocessor ID, graphics processing unit ID, RAM module ID, memory storage ID, TPM module ID including generated ID, DI chip (FIG. 8), and any circuitry of their combinations. Alternatively, hardware interfacing on the AuT rendered to contain an embedded DI chip exemplarily illustrated as DI chip 800 depicted in FIG. 8*m* so that the hardware interfacing is performed on DI chip (i.e., a single component) for the device hardware IDs, rather than on all hardware components.

Software interfacing is achieved by interfacing an OS or per-machine-based core software programs installed on memory circuitry or memory storage, so that the device OS ID may be selected from the group consisting of device OS license ID, activation ID, installation ID, digital license ID, machine ID, software program serial key, digital license key ID, biometric data ID, and any of their combinations.

S1105 registers the DI information to a database on the OS verification server. S1106 checks if the incoming request contains valid OS license ID (OS IDs hereinafter) and/or activation ID. Note that OS IDs are genuine license IDs or keys generated for sale by OS providers and the OS refers generally to any per-machine-based software program or app. An OS verification server may store all of genuine or valid OS IDs or contain an algorithm for validating legitimacy or genuineness of an OS ID to be validated. If no OS ID is detected at S1106, a request to provide OS ID at S1107 will be issued to the AuT, computer or communication device for retrieving its OS ID and/or activation ID.

The DI information and the OS ID obtained from the AuT, computer or communication device are associated at the step of S1108, which are further validated at S1109 to determine if there is a match comparing with an OS-DI database saved in the OS verification server. If validated, the OS ID of the AuT, computer or communication device will be activated for association with its DI information. Online access for OS update or upgrade will then be allowed.

Preferably, method 1100 comprises building the OS-DI database stored on server memory circuitry in circuit connection with the OS verification server, wherein the OS-DI database comprises (i) validating OS IDs that may be fulfilled by having all genuine OS IDs stored on the server memory circuitry and/or by providing an algorithm for performing OS ID validating, and (ii) hardware DI information of registered external devices. The building is rendered for building the OS-DI database having an associated relationship between genuine OS IDs and hardware DI information. OS-DI validating S1109 is further rendered for validating if a genuine OS ID is associated with two sets of hardware DI information (or two machines).

If validation of OS-DI fails at S1109, followed is S1110 to reregister the OS license ID and the activation ID previously registered in the OS-DI database. The reregistering includes to check if the OS license ID is previously associated with another DI information. An OS provider has an option for an OS license ID to be activated with only a single machine by deregistering the DI information of a previous machine. S1111 checks If reregistering succeeds or not. Validated OS-DI S1109 and succeeded reregistering S1111 will allow the OS or software of an AuT, computer or communication device to be activated and to be allowed for OS updating or upgrading at S1112. A failed reregistering at S1111 will render the OS ID of an AuT, computer or communication device deactivated, denied (for OS updating), or even incurred with a BSOD (the Blue Screen of Death) at the step of S1113.

Thus, the eleventh primary preferred embodiment allows a software/OS provider to virtually stop any software piracy when the OS license ID and/or activation ID are associated with the DI hardware information of a device.

Further provided in method S1100 are steps of detecting cyberattacking S1120 and imposing punitive damages. If the OS verification server detects cyberattacking, S1120 will be followed with S1121 for creating a banned DI list and imposing punitive damages including to render any new external device if comprising any hardware component embedded with identified hardware IDs, incapable of obtaining any online access, and to render its OS ID invalid for operating and deactivated at S1113.

In summary, the eleventh primary preferred embodiment is an operating method for providing software piracy protection and cybersecurity protection, comprising: (a) enabling a verification server, in response to an incoming signal issued from an external device containing no device ID, to request the external device to provide device hardware IDs embedded and device OS IDs installed on the external device, wherein the IDs refer to identification numbers and/or serial numbers; (b) retrieving the device hardware IDs and the device OS IDs from the external device to the verification server; (c) setting at least one of the device hardware IDs to be focused as hardware DI information of the external device; (d) building an OS-DI database stored on server memory circuitry in circuit connection with the verification server, for associating OS IDs with registered hardware DI information of registered external devices; (e) validating the device OS ID and the hardware DI information retrieved from the external device in comparison with the OS-DI database; and (f) if validated, activating the device OS ID.

DI Intercommunication Between Control Devices and AI Robots

Figure 12:
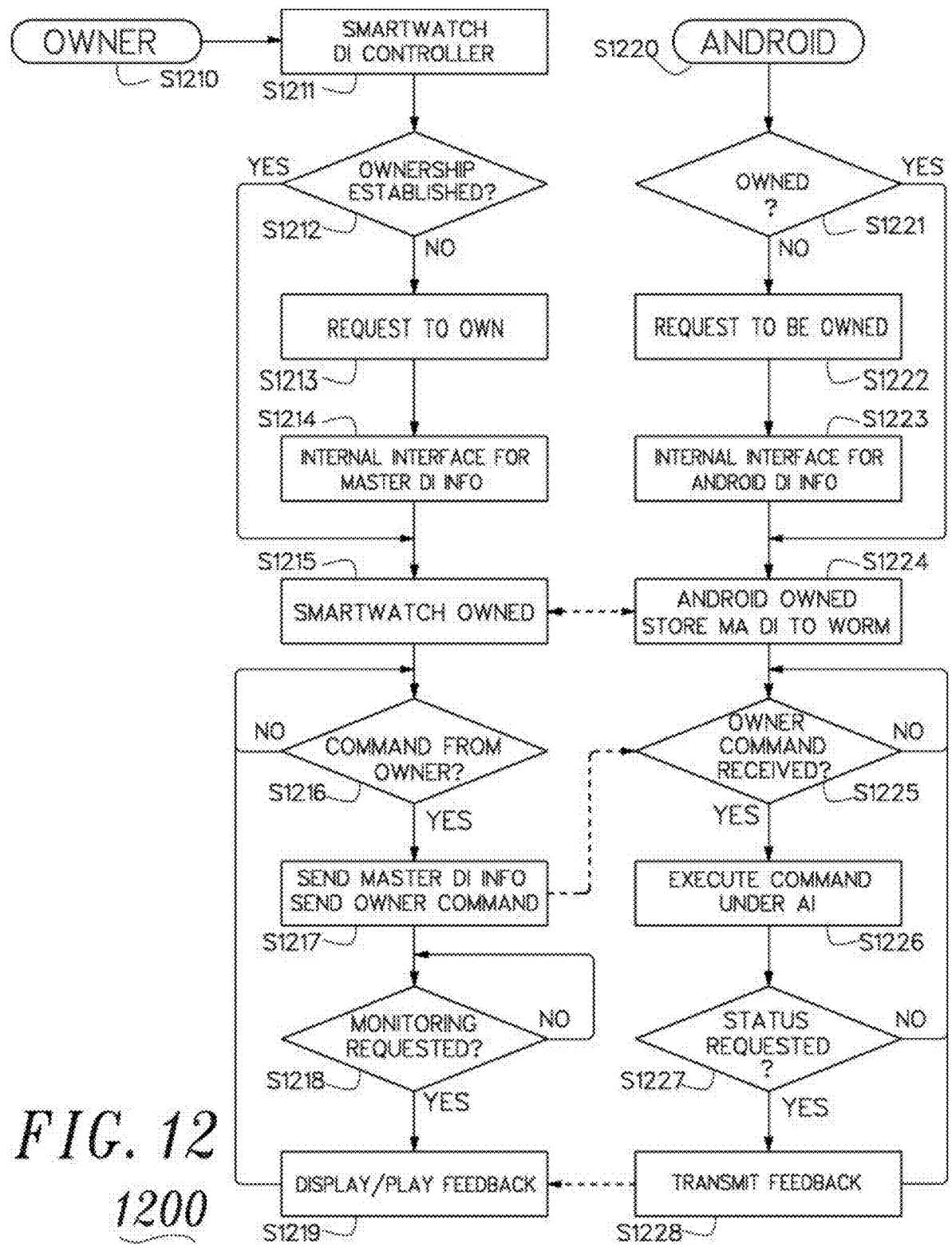
FIG. 12 is a method establishing DI intercommunication between robots and control systems for cybersecurity protection and secured DI control, in accordance with a twelfth primary preferred embodiment of the present invention.

FIG. 12 is a twelfth primary preferred embodiment showing a method S1200 providing DI intercommunication as cybersecurity protection for an owner to securely control AI devices/machines such as androids, AI robotic workers, humanoid nannies, servants, housekeepers, bodyguards, soldiers, autonomous cars, drones, bionic machines, or others with non-human forms or shapes. There are many circumstances requiring an AI robot be controlled securely, exclusively, and remotely.

Illustrated in FIG. 12 is DI intercommunication method S1200 showing an owner S1210 possessing a smartwatch (wearable device, smartphone or any control device) S1211 as a secured DI controller for exclusively and/or remotely controlling an android (or robot) S1220.

Owner S1210 may establish ownership of smartwatch S1211 by biometric, voice recognition, fingerprint, pin code, or any other login method. S1212 and S1221 check if smartwatch S1211 and android S1220 are respectively owned for owner S1210 to establish an exclusive control. For a fresh start or not owned S1221, preferably, owning is proceeded at S1213 by requesting smartwatch S1211 to own android S1220, and android S1220 to be owned at S1222 by smartwatch S1211. S1214 internal interfacing is for generating master DI information from interfacing smartwatch hardware components, while S1223 internal interfacing is for retrieving android DI information internally from android hardware components. The master DI information and the android DI information may also be replaced respectively by a smartwatch DI chip and an android DI chip exemplarily illustrated as DI chip 800 depicted in FIG. 8, dedicated for establish the exclusive owning or secured DI intercommunication to eliminate any external interfering or cyberattacking The owning is to bond the exclusive ownership between smartwatch S1211 and android S1220 by DI information. Differently, Bluetooth exchanges Bluetooth's information by paring (similar to exchange phone numbers), in which data is transmitted through one of 79 designated Bluetooth channels, and its paring is known to be subjected to cyberattacking. In contrast, the DI owning of the present invention is accomplished by registering DI information of hardware and/or OS. Each of smartwatch S1211 and android S1220 has communication circuitry capable of sending/receiving cellular and/or satellite signal, exemplarily shown as Wi-Fi/LAN 735 in FIG. 7 and Wi-Fi/Ethernet circuitry 840 integrated in DI chip 800 in FIG. 8. The exclusive ownership is accomplished at S1215 smartwatch owned and S1224 android owned, by transmitting master DI information S1214 to android S1220 and/or android DI information S1223 to smartwatch S1211 for completing device registration and for establishing device exclusive ownership.

Preferably, android S1220 is equipped with Write Once Read Many (WORM) memory circuitry thereon for S1224 to proceed with a step of storing master DI information provided from smartwatch S1211. The persistent master DI information on the WORM functions as a sole digital fingerprint rendering android S1220 exclusively owned by smartwatch S1211 and thus owner S1210, facilitating instant DI intercommunication without interfacing other hardware components.

After owned, smartwatch S1211 enters S1216 waiting for a command from owner S1210 to be issued. S1217 sends master DI information and an owner command to android S1220 at S1225, in which android S1220 detects if an owner command issued from smartwatch S1211 is received. Sending master DI information together with owner commands ensures the authenticity of the owner commands for eliminating any cyberattacking. S1225 is further rendered to determine if the master DI information accompanying with the owner command received has a match with the master DI information of record previously stored in the WORM memory circuitry, for authenticating the owner commands.

The master DI information may be time stamped with a specific elapsed length of time to define when a subsequent owner command to be issued or arrived, enabling android S1220 capable of validating the authenticity of the subsequent owner command by the stamped time. Another preferred embodiment is to have owner commands encrypted for cybersecurity protection. The received owner command is executed at S1226 under AI by android S1220.

Owner S1210 may request the execution of S1218 for monitoring the current status of android S1220 after S1225 owner command received is executed under AI at S1226 and S1227 detecting if a status request is received by android S1220. If yes, S1227 transmits feedback data to smartwatch S1211 for visual displaying and/or audio playing at S1219.

In summary, the twelfth primary preferred embodiment is an operating method for establishing DI intercommunication with cybersecurity protection between a control device and a robotic device. The operating method comprises (a) requesting the control device be internally interfaced for its hardware IDs (referring to identification numbers and/or serial numbers) embedded thereon, as master DI information; (b) separately requesting the robotic device be internally interfaced for its hardware IDs embedded thereon, as robot DI information; (c) selectively registering the master DI information onto the robotic device, and/or the robot DI information onto the control device, for establishing ownership; (d) attaching a command to be issued from the control device selectively with the master DI information and/or the robot DI information for establishing the DI intercommunication; (e) instructing the robotic device to verify if the command received externally is attached selectively with the master DI information and/or the robot DI information; and (f) allowing the robotic device to execute the command if selectively the master DI information and/or the robot DI information is validated, so as to provide the cybersecurity protection to the DI intercommunication.

Similarly, FIG. 12 may also be recited as an operating method rendering a system cybersecurity protected, comprising: (a) enabling the system, in response to an incoming signal issued from an external device, to request the external device to provide external device IDs embedded thereon if detecting the incoming signal contains no device ID, wherein the external device comprises at least communication circuitry for establishing intercommunication with the system; (b) obtaining the external device IDs from the enabling, for use as a unique fingerprint of the external device; (c) building a DI database resided on the system, comprising banned device IDs representing remote devices to be banned from establishing intercommunication with the system; and (d) allowing the external device to establish intercommunication with the system through the communication circuitry, only if the unique fingerprint is obtained and not comprised in the banned IDs.

DI-Encrypted Intercommunication

Figure 13:
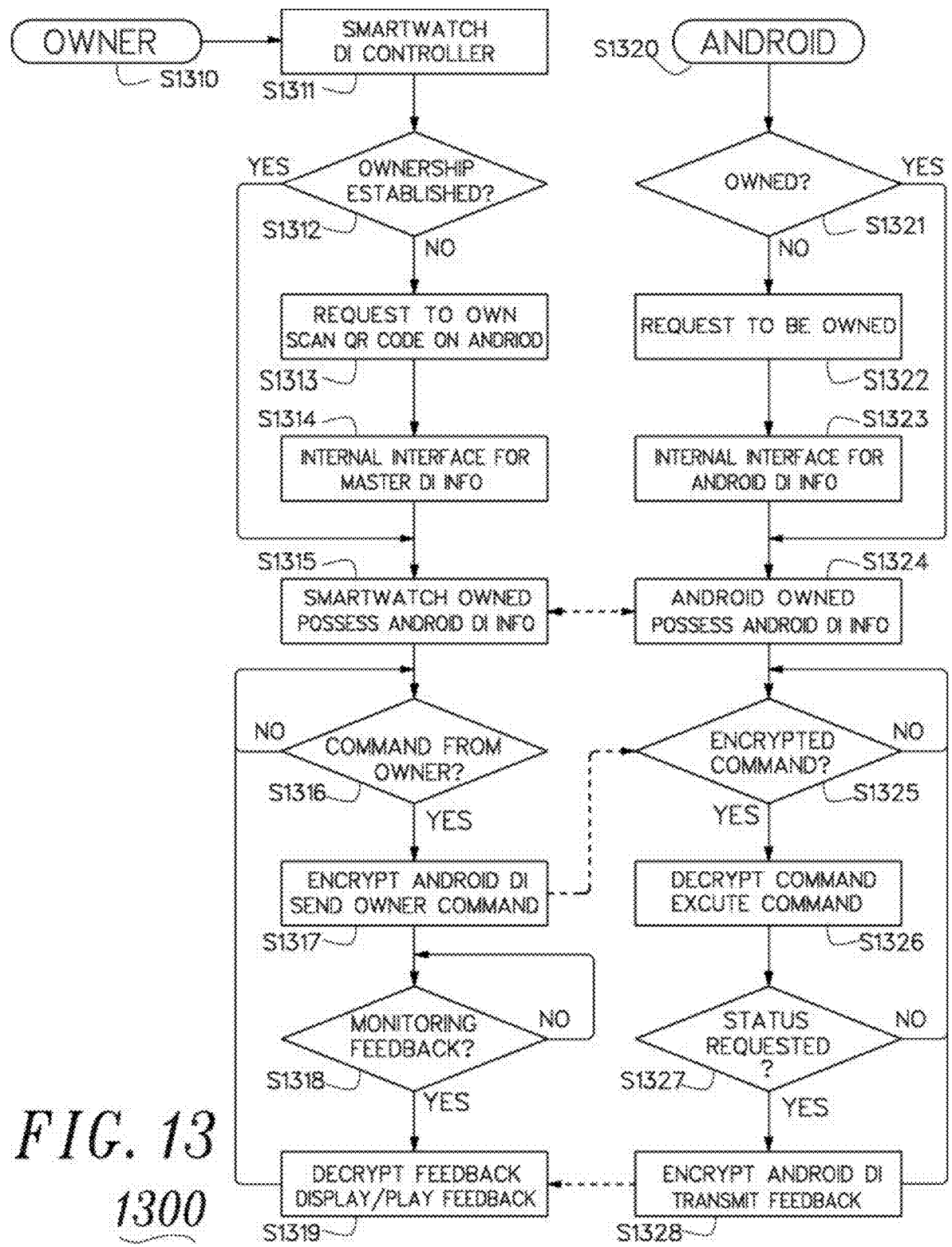
FIG. 13 is a method providing cybersecurity protection by encoding or encrypting data with DI information for intercommunication between an autonomous device and a control system, in accordance with a thirteenth primary preferred embodiment of the present invention.

FIG. 13 is a thirteenth primary preferred embodiment showing intercommunication data is encrypted for cybersecurity protection. Similar to FIG. 12, FIG. 13 shows an owner S1310 possessing a smartwatch (wearable device, smartphone or any control device) S1311 as a secured DI controller for exclusively and/or remotely controlling an android S1320.

Owner S1310 may establish ownership of smartwatch S1311 by biometric, voice recognition, fingerprint, pin code, or any other login method. S1312 and S1321 check if smartwatch S1311 and android S1320 are respectively owned. For a fresh start, preferably, ownership is established by scanning an QR code on android S1320 for linking to a manufacturer's website for registration and ownership. Owner S1310 requests smartwatch S1311 to own android S1320 at S1313, and android S1320 to be owned at S1322. S1314 internal interfacing is for generating master DI information from interfacing smartwatch hardware components, while S1323 internal interfacing is for retrieving android DI information internally from android hardware components. The master DI information and the android DI information may also be replaced respectively by a smartwatch DI chip and an android DI chip exemplarily illustrated as DI chip 800 depicted in FIG. 8, dedicated for instantly establishing the exclusive owning or secured DI intercommunication to eliminate any interfering or cyberattacking The DI owning of the present primary preferred embodiment is to register android DI information obtained at S1323 to smartwatch S1311, while to enroll smartwatch DI information obtained at S1314 to android 1320. Each of smartwatch S1311 and android S1320 has communication circuitry capable of sending/receiving wireless cellular and/or satellite signals, as exemplarily shown as Wi-Fi/LAN 735 in FIG. 7 and Wi-Fi/Ethernet circuitry 840 integrated in DI chip 800 in FIG. 8. The exclusive ownership is accomplished at S1315 smartwatch owned and at S1324 android owned.

After ownership is established, smartwatch S1311 enters S1316 waiting for a command from owner S1310 to be issued. S1317 encrypts an owner command to be sent out with the android DI information and/or the master DI information. Sending owner commands encrypted with the android DI information and/or the master DI information ensures the authenticity of owner commands to be readable and executable only by the intended android S1320. Furthermore, android S1320 is rendered to be controllable by the DI-encrypted commands, in which android S1320 is the only device possessing the unique DI information so as to eliminate any cyberattacking. S1325 detects if there is an encrypted owner command issued from android S1320.

The DI-encrypted commands may further be time stamped with a specific elapsed length of time, which defines when a subsequent owner command to be issued or arrived, enabling android S1220 capable of validating the authenticity of the subsequent owner command by the stamped time, in addition to the DI encryption for cybersecurity protection. The encrypted owner command is decrypted by the android DI information and/or the master DI information (as its unique private key) executed at S1326 by android S1320.

At S1318, owner S1310 requests to monitor the current status of android S1320 after S1325 owner command is executed at S1326 and S1327 detects if a status request from owner 1310 is received by android S1320. If yes, S1328 encrypts and transmits DI-encrypted feedback to smartwatch S1311 for visual displaying and/or audio playing at S1319 by decrypting the DI-encrypted feedback with the android DI information and/or the master DI information functioning as its unique private key.

It is known that the advent of quantum computing has rendered asymmetric key algorithms vulnerable to attacks, and all public key schemes are in theory susceptible to a brute-force key search attack. In contrast, the thirteenth primary preferred embodiment employs a different encryption and decryption infrastructure either to replace the conventional cryptography or to add as an augmented layer. The DI-encrypted cybersecurity protection (selectively associated with controller/smartwatch S1311 and/or android S1320) provides the one and only key matching to the internal hardware components and OS ID of android S1320 for its novel uniqueness.

S1326 is further rendered to verify if the decrypted DI information has a match with the internal hardware components and/or with the OS ID of android S1320, before the owner command is accepted for execution, so as to provide another layer of cybersecurity protection.

In essence, the thirteenth primary preferred embodiment is a method for providing DI-encrypted intercommunication with cybersecurity protection exemplarily to a control device and a robot, comprising: (a) requesting the control device be internally interfaced for its hardware and/or OS IDs embedded thereon, as master DI information; (b) separately requesting the robotic device be internally interfaced for its hardware and/or OS IDs embedded thereon, as robot DI information; (c) selectively registering the master DI information onto the robotic device, and/or the robot DI information onto the control device, for establishing exclusive ownership; (d) encrypting a command to be issued from the control device selectively with the master DI information and/or the robot DI information for establishing the DI-encrypted intercommunication; (e) instructing the robot to decrypt the encrypted command externally received selectively with the master DI information and/or the robot DI information; and (f) allowing the robot to execute the command if selectively the master DI information and/or robot DI information contained in the command issued from the control device is validated, so as to provide the cybersecurity protection to the DI-encrypted intercommunication. In conclusion, the primary preferred embodiments exemplified in FIGS. 1 to 13 have demonstrated that unique integration of DI information and DI intercommunication is capable of providing an efficient infrastructure of cybersecurity protection for replacing the conventional practice of utilizing antivirus software that is known to be bulky in size, power-hungry in executing, and vulnerable to cyberattacks.

Finally, it is clearly understood that such embodiments are provided by way of illustration and example only and are not to be taken by way of limitation as numerous variations, changes, modification, omissions, adaptations and/or alterations, combinations and substitutions will occur to those skilled in the art without departing from the invention herein. Furthermore, the steps of the processes and/or the methods disclosed in the examples may be modified in any manner, including by reordering steps and/or inserting or deleting steps. Accordingly, it is intended that the invention be limited only by the spirit and scope of the appended claims.

What is claimed is:

1. An autonomous device capable of providing cybersecurity protection, comprising:
 (a) hardware components comprising processing circuitry, memory circuitry, communication circuitry, and sensor circuitry interconnected with system buses; and (b) control algorithms comprising:
  (i) actuating said autonomous device to perform internal hardware interfacing for the device IDs (referring to identification numbers and/or serial numbers) of said hardware components;
  (ii) retrieving said device IDs internally via said system buses from said internal hardware interfacing;
  (iii) setting at least one of said device IDs to be focused as a unique fingerprint of said autonomous device;
  (iv) allowing said unique fingerprint to be transmitted out to an external control system for establishing a registered relationship; and
  (v) marking said autonomous device as registered, if said registered relationship is established successfully.

2. The autonomous device of claim 1, wherein said internal hardware interfacing refers to interfacing device hardware comprising: (i) said processing circuitry for executing said control algorithms, (ii) a motherboard thereon situated with said processing circuitry, and (iii) said memory circuitry installed thereon an OS, so that said internal hardware interfacing is rendered capable of retrieving said device IDs comprising embedded hardware IDs and installed software IDs comprising device OS license ID and activation ID by interfacing said memory circuitry.

3. The autonomous device of claim 1, wherein said control algorithms further comprise receiving feedback signals selectively through said communication circuitry and/or through said sensor circuitry selected from the group consisting of digital signals, non-digital signals, laser signals, wireless waves, LiDAR (Light raDAR), and any of their combinations.

4. The autonomous device of claim 1, wherein said control algorithms further comprise storing unique DI (device identification) information of trusted external control systems once said registered relationship is established, for said autonomous device selectively (i) to automatically grant permission to proceed with instructing, if said feedback signals comprise said unique DI information, or (ii) to ignore any fraudulent incoming signal without comprising said unique DI information.

5. The autonomous device of claim 1, wherein said control algorithms further comprise (i) receiving feedback signals selectively through said communication circuitry and/or through said sensor circuitry; (ii) validating authenticity of said feedback signals responded selectively from an external system and/or an object, by detecting if said feedback signals comprise digital data of said registered relationship, and (iii) if validated, relaying said feedback signals to artificial intelligence circuitry in circuit connection with said autonomous device for proceeding with responded autonomous actions in accordance with said feedback signals, wherein said external system comprises external communication circuitry, and wherein said object contains no communication circuitry and said feedback signals comprise additional non-digital signals selectively bounced back from and/or absorbed by said object detected by said sensor circuitry.

6. The autonomous device of claim 1, wherein said control algorithms further comprise encrypting outgoing signals to be transmitted out, and decrypting said feedback signals returned from said external control system and/or an object, by utilizing said unique fingerprint as a unique private key for said encrypting and said decrypting.

7. The autonomous device of claim 1, wherein said control algorithms further comprise a step of installing and/or embedding said actuating, said retrieving, said setting, and said allowing, onto a single component selected from the group consisting of a chip, a firmware, an algorithm, a coprocessor, a circuit, and any circuitry of their combinations, so that said actuating is rendered to perform said internal hardware interfacing on said single component for said device IDs, rather than on all hardware components contained in said autonomous device.

8. The autonomous device of claim 1, wherein said control algorithms further comprise a step of installing and/or embedding said actuating, said retrieving, said setting, and said allowing, onto a single component selected from the group consisting of a chip, a firmware, an algorithm, a coprocessor, a circuit, and any circuitry of their combinations, and wherein said autonomous device is in a form selected from the group consisting of a communication device, computer, control system, server, Internet system, smartphone, smartwatch, Autonomous Thing (AuT), Internet of Autonomous Thing (IoAT), Internet of Medical Thing (IoMT), AI device/machine, robot, android, autonomous car or unmanned aerial vehicle, drone and/or unmanned aircraft system.

9. A cybersecurity protected control system, comprising:
  (a) hardware components comprising processing circuitry, memory circuitry and communication circuitry; and
  (b) control algorithms comprising:
    (i) in response to an incoming signal issued from an external autonomous device, requesting said external autonomous device to preform internal hardware interfacing for providing external device IDs (referring to identification numbers and/or serial numbers) of said external autonomous device, if detecting said incoming signal contains no device ID;
    (ii) retrieving said external device IDs to said memory circuitry;
    (iii) setting at least one of said external device IDs as a unique fingerprint of said external autonomous device;
    (iv) building a registered relationship with said external autonomous device, based on said unique fingerprint;
    (v) allowing said cybersecurity protected control system to be established for intercommunication with said external autonomous device, if said registered relationship is verified; and
    (vi) sending feedback signals to said external autonomous device.

10. The cybersecurity protected control system of claim 9, wherein said retrieving is rendered for said external autonomous device to perform said internal hardware interfacing on:
  (i) processing circuitry;
  (ii) a motherboard thereon situated with said processing circuitry;
  (iii) memory circuitry installed with an OS;
  (iv) communication circuitry; and
  (v) system buses in circuit connection with said processing circuitry, said motherboard, said memory circuitry and said communication circuitry for establishing said hardware interfacing for said external device IDs comprising embedded hardware IDs and installed software IDs, wherein said software IDs comprise device OS license ID, activation ID, and digital license ID installed on said memory circuitry;

so as through said communication circuitry to allow said external device IDs to be retrieved from said external autonomous device to said cybersecurity protected system.

11. The cybersecurity protected control system of claim 9, wherein said setting is rendered said at least one of said external device IDs to be selected from the group consisting of system product ID, universally unique identifier, Input/Output System firmware ID, motherboard ID, microprocessor ID, graphics processing unit ID, RAM module ID, memory storage ID, TPM module ID, DI chip, device OS license ID, activation ID, installation ID, digital license ID, machine ID, per-machine-based software program serial key, digital key ID, biometric data ID, and any of their combinations, for use as said unique fingerprint.

12. The cybersecurity protected control system of claim 9, wherein said sending feedback signals comprises sending at least one signal selected from the group consisting of digital data, returned laser signals, returned wireless wave, non-digital signals, and any of their combinations.

13. The cybersecurity protected control system of claim 9, wherein said feedback signals comprise data selectively encrypted with said unique fingerprint of said external autonomous device and/or with DI information of said cybersecurity protected control system for providing cybersecurity protection to said sending feedback signals.

14. The cybersecurity protected control system of claim 9, wherein said control algorithms further comprise detecting if an incoming signal contains said registered relationship, before processing said incoming signal for providing said feedback signals to be sent to said external autonomous device.

15. A method for providing software piracy protection and cybersecurity protection to a verification server, comprising:
 (a) enabling said verification server, in response to an incoming signal received from an external device without carrying any device ID, to issue a command for requesting said external device to perform (i) hardware interfacing internally on at least one chip embedded on a board contained in said external device for device hardware IDs and (ii) software interfacing internally on device memory circuitry in circuit connection with said board installed thereon an OS for retrieving a device OS ID, wherein said ID or IDs refer to identification numbers and/or serial numbers;
 (b) retrieving said device hardware IDs and said device OS IDs from said external device to said verification server;
 (c) setting at least one of said device hardware IDs to be focused as hardware DI information of said external device;
 (d) building an OS-DI database stored on server memory circuitry in circuit connection with said verification server, for associating genuine OS IDs with registered hardware DI information of registered external devices;
 (e) validating said device OS ID and said hardware DI information retrieved from said external device in comparison with said OS-DI database; and
 (f) if validated, activating said device OS ID.

16. The method of claim 15, wherein said retrieving is rendered for said external device to perform said hardware interfacing internally on said board, said at least one chip embedded and said device memory circuitry for (i) said device hardware IDs selected from the group consisting of system product ID, universally unique identifier, MAC addresses of wired and/or wireless communication circuitry integrated onto said board, Input/Output System firmware ID, board ID, microprocessor ID, graphics processing unit ID, RAM module ID, memory storage ID, TPM module ID, DI chip, and any circuitry of their combinations; and for (ii) said device OS ID selected from the group consisting of device OS license ID, activation ID, installation ID, digital license ID, machine ID, software program serial key, digital license key ID, biometric data ID, and any of their combinations.

17. The method of claim 15, wherein said setting is rendered to set said at least one of said device hardware IDs selected from the group consisting of system product ID, universally unique identifier, MAC addresses of communication circuitry integrated onto said board, Mobile Equipment ID, Input/Output System firmware ID, motherboard ID, microprocessor ID, graphics processing unit ID, memory storage ID, TPM module ID, DI chip, and any circuitry of their combinations, for use as said hardware DI information.

18. The method of claim 15, wherein said building is rendered for said OS-DI database to comprise selectively all genuine OS IDs and/or an algorithm capable of preforming OS ID validating.

19. The method of claim 15, wherein said setting is rendered for said hardware DI information to have a fixed length of digits in an acceptable format, and wherein said validating is rendered for validating if a genuine OS ID is associated with two of said registered hardware DI information.

20. The method of claim 15 further comprising (i) detecting if said external device is involved in cyberattacking, and (ii) imposing punitive damages to said external device if involved, wherein said punitive damages comprise deactivating said device OS ID on said verification server.

\* \* \* \* \*